US011403936B2

(12) United States Patent
Schrebe et al.

(10) Patent No.: US 11,403,936 B2
(45) Date of Patent: Aug. 2, 2022

(54) HYGIENIC DEVICE INTERACTION IN RETAIL ENVIRONMENTS

(71) Applicant: Smith Micro Software, Inc., Pittsburgh, PA (US)

(72) Inventors: Ryan Christopher Schrebe, Wexford, PA (US); Scott Henry Anderson, Temecula, CA (US); Andrew L Foulke, Bethel Park, PA (US)

(73) Assignee: Smith Micro Software, Inc., Pittsburgh, PA (US)

( * ) Notice: Subject to any disclaimer, the term of this patent is extended or adjusted under 35 U.S.C. 154(b) by 0 days.

(21) Appl. No.: 17/241,408

(22) Filed: Apr. 27, 2021

(65) Prior Publication Data

US 2021/0390843 A1 Dec. 16, 2021

Related U.S. Application Data

(60) Provisional application No. 63/038,641, filed on Jun. 12, 2020.

(51) Int. Cl.
*G08B 21/24* (2006.01)
*G06F 3/16* (2006.01)
*G06K 7/14* (2006.01)
*G06F 3/01* (2006.01)
(Continued)

(52) U.S. Cl.
CPC ........... *G08B 21/245* (2013.01); *G06F 3/017* (2013.01); *G06F 3/167* (2013.01); *G06K 7/1417* (2013.01); *G06V 20/52* (2022.01); *G06V 40/161* (2022.01)

(58) Field of Classification Search
CPC .............. G08B 21/0469; G08B 21/182; G08B 26/008; G08B 31/00; G06F 1/163; H04W 4/029
See application file for complete search history.

(56) References Cited

U.S. PATENT DOCUMENTS 10,235,861 B1 * 3/2019 Burns ................... G08B 21/182
11,128,636 B1 * 9/2021 Jorasch .................... G06F 3/015
11,227,481 B1 * 1/2022 Bran ..................... G08B 21/245
(Continued)

FOREIGN PATENT DOCUMENTS

KR 1020110108647 2/2013

OTHER PUBLICATIONS

International Search Report and Written Opinion dated Sep. 1, 2021 for PCT/US2021/031286.

*Primary Examiner* — An T Nguyen
(74) *Attorney, Agent, or Firm* — Farjami & Farjami LLP

(57) ABSTRACT

A device includes a display, a camera, a memory storing a software code, and a hardware processor configured to execute the software code to: configure the device to be in a first mode; receive, from the camera, camera data of an environment surrounding the device; determine that a person is present in the environment based on the camera data; determine that the person is facing the display based on the camera data; and transition the device from the first mode to a second mode, in response to determining that the person is facing the display. The display displays a first content when the device is in the first mode, and displays a second content different than the first content when the device is in the second mode. The second content is configured to provide information about the device to the person without requiring the person to touch the device.

20 Claims, 9 Drawing Sheets

(51) Int. Cl.
 *G06V 20/52* (2022.01)
 *G06V 40/16* (2022.01)

(56) References Cited

U.S. PATENT DOCUMENTS

| | | |
|---|---|---|
| 2013/0054377 A1 | 2/2013 | Krahnstoever et al. |
| 2014/0139629 A1 | 5/2014 | Baiyya et al. |
| 2014/0189395 A1* | 7/2014 | Kp ................. G06F 1/3218 |
| | | 713/320 |
| 2014/0189563 A1 | 7/2014 | Kim |
| 2016/0323508 A1 | 11/2016 | Ayalasomayajul et al. |
| 2018/0322870 A1 | 11/2018 | Lee et al. |
| 2020/0029795 A1* | 1/2020 | Sly ................. G06F 3/04842 |
| 2020/0382613 A1* | 12/2020 | Sundstrom ............ G06F 3/0482 |

\* cited by examiner

HYGIENIC DEVICE INTERACTION IN RETAIL ENVIRONMENTS

RELATED APPLICATION(S)

The present application claims the benefit of and priority to Provisional Patent Application Ser. No. 63/038,641, filed Jun. 12, 2020, and titled "Hygienic Device Interaction in Retail Environments," which is hereby incorporated fully by reference into the present application.

BACKGROUND

The world is presently in the grip of a pandemic due to spread of severe acute respiratory syndrome coronavirus 2 (SARS-CoV-2), the virus that causes coronavirus disease 2019 (COVID-19). Until a vaccine to SARS-CoV-2 is developed, so called "herd immunity" to the virus is achieved, or until contagion to the virus dies out of its own accord, mitigating strategies for avoiding contagion or at least reducing viral load during transmission will continue to be considered best practices. Those mitigating strategies are likely to continue to include social distancing, the wearing of masks or other partial facial coverings (hereinafter simply "masks"), and avoidance of physical contact with surfaces touched by others. However, and as recent experience has demonstrated, extreme mitigation measures such as lockdowns or the temporary prohibition of various forms of commerce can have devastating effects on the financial welfare of individuals, households, and businesses, as well as the global economy as a whole.

Consequently, there is a need for a host of solutions to enable consumers and retail employees alike to resume their normal activities, while minimizing the contagion risks associated with those activities.

DETAILED DESCRIPTION

Figure 1:
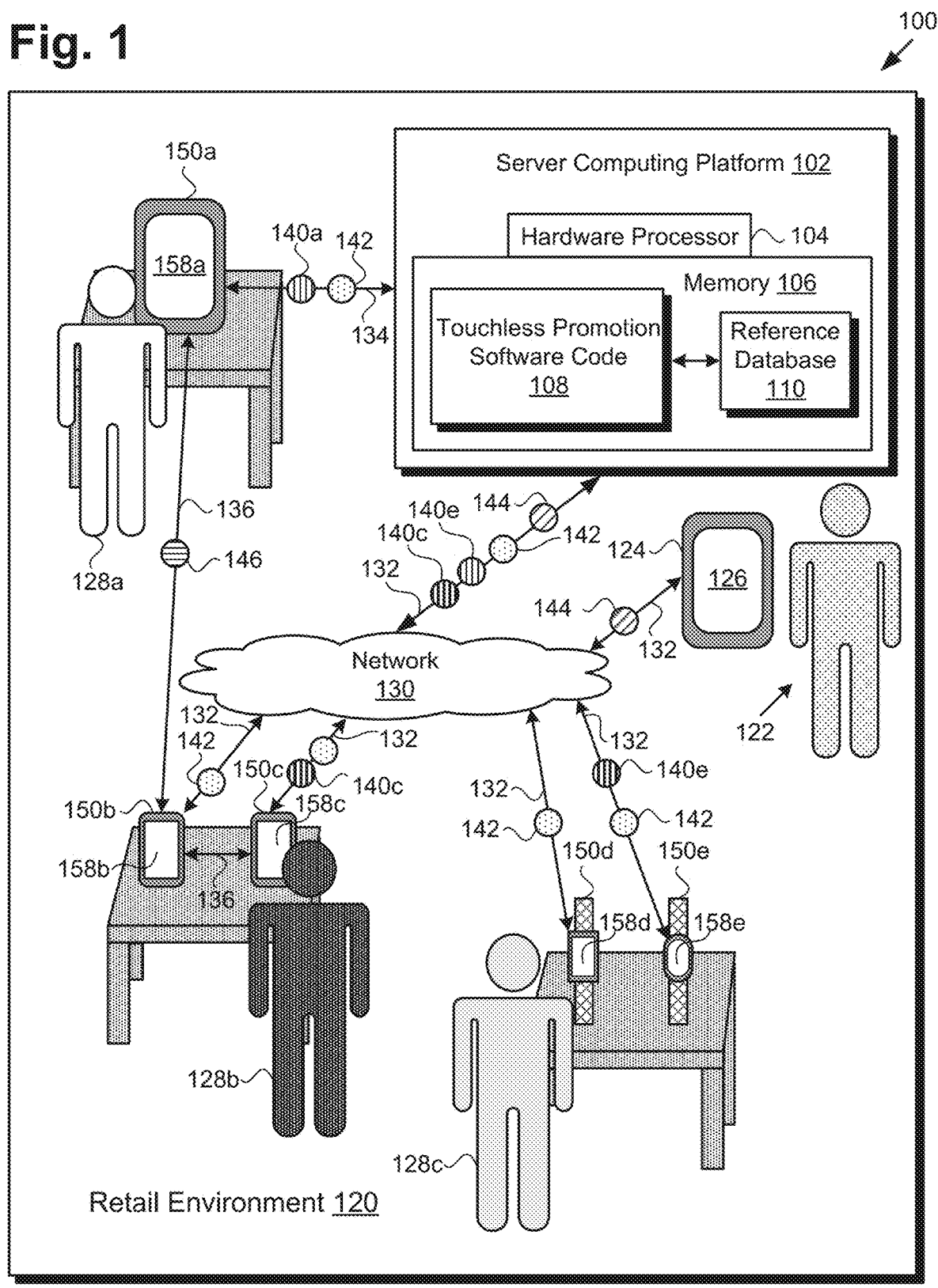
FIG. 1 shows a diagram of an exemplary system for ensuring hygienic device interaction in a retail environment, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals.

The present application addresses the societal challenges described above in the context of consumer electronics retail environments, by disclosing systems, software, and methods for ensuring hygienic interactions with devices being promoted for sale or lease. By configuring such consumer electronics devices to detect the presence of a potentially interactive consumer through facial recognition, even when the consumer is wearing a mask, the present solution advantageously encourages hygienic best practices on the part of the consumer, while imposing no additional inconvenience for that socially responsible conduct. Furthermore, by initiating the display of promotional content automatically in response to detecting the presence of the consumer, the present solution advantageously enables the consumer to interact extensively with the consumer electronics device to obtain pricing information, device specifications, and instructions for utilizing voice commands or touchless gestures to access additional content, without making physical contact with the device. Moreover, according to the present solution, a sanitized device that has not been touched, or used by an unmasked consumer, displays a sanitization assurance message until a potentially contaminating action occurs, at which time the sanitization assurance message disappears until the device is re-sanitized. Optionally, the software can be configured such that it displays a hygiene warning message to consumers when a device needs to be sanitized as a warning for them not to touch the device. Thus, in various implementations, the software may be configured to show or hide the sanitization assurance message once the device has been sanitized.

It is noted that, as used herein, the expression "facial recognition," as used to characterize detection of the presence of a potentially interactive consumer, does not include identification of a particular individual as such, or the generation or retention of personally identifiable information (PII) of consumers interacting with a consumer electronics device. In other words, facial recognition may detect a face generally, without identifying a person uniquely or specifically. Thus, in one implementation, the devices described herein are able to distinguish a consumer anonymously, without the consumer having previous interaction experience with the same or another device, and without the systems and software disclosed in the present application being configured to retain information describing the age, gender, race, ethnicity, or any other PII of any interacting user. However, in other implementations, age, gender or information regarding other telltale physical traits may be used temporarily to drive customized promotional information to the consumer based on those perceived characteristics. In yet other implementations, the systems and software disclosed in the present application may be configured to collect PII, store PII in memory, and perform a variety of actions based on the PI and detection of the presence of a potentially interactive consumer.

It is further noted that, in some implementations, the methods disclosed by the present application may be performed as substantially automated processes by substantially automated systems. As used in the present application, the terms "automation," "automated", and "automating" refer to systems and processes that do not require the participation of a human user, such as a retail employee or system administrator. Although, in some implementations, human participation in or review of the performance of the systems described herein may occur, that human involvement can be optional. Thus, in some implementations, the methods described in the present application may be performed under the control of hardware processing components of the disclosed automated systems.

FIG. 1 shows a diagram of an exemplary system for ensuring hygienic device interaction in a retail environment, according to one implementation. As shown in FIG. 1, system 100 can include server computing platform 102 having hardware processor 104, and memory 106 implemented as a non-transitory storage device storing touchless promotion software code 108 and reference database 110. Examples of the data stored in reference database 110 include consumer interaction data, and data describing the consumer electronics devices and services offered for sale through retail environment 120, the technical specifications of such devices, as well as prices and available promotions for the offered devices and services, to name a few.

As further shown in FIG. 1, system 100 may be implemented within retail environment 120 in which consumer electronics devices 150a, 150b, 150c, 150d, and 150e (hereinafter "consumer devices 150a-150e") having respective displays 158a, 158b. 158c, 158d, and 158e (hereinafter "displays 158a-158e") are being promoted for sale or lease. In addition. FIG. 1 shows consumers 128a, 128b, and 128c (hereinafter "consumers 128a-128c"), employee 122 of retail environment 120, utilizing retailing device 124 having display 126. Also shown in FIG. 1 is communication network 130 providing network communication links 132, promotion effects 140a. 140c, and 140e, sanitization data 142, sanitization alert 144, activation prompt 146, wired communication link 134, and inter-device wireless communication links 136.

As shown in FIG. 1, consumer devices 150a-150e may take a variety of forms. For example, according to the present exemplary implementation, consumer device 150a is depicted as a tablet computer or smartphone in wired communication with server computing platform 102. By contrast, consumer devices 150b and 150c are depicted as tablets or smartphones, and consumer devices 150d and 150e are depicted as smartwatches, all shown to be in wireless communication with server computing platform 102 via communication network 130 and network communication links 132.

However, it is noted that those specific device types shown in FIG. 1 are merely exemplary. More generally, consumer devices 150a-150e may be any suitable mobile or stationary computing devices or systems that implement data processing capabilities sufficient to provide a user interface, support connections to server computing platform 102 or communication network 130, and implement the functionality ascribed to consumer devices 150a-150e herein. For example, in other implementations, one or more of consumer devices 150a-150e may take the form of a laptop computer, a smart TV, an e-reader, or a game console, for example. Alternatively, in some implementations, one or more of consumer devices 150a-150e may take the form of an augmented reality (AR) or virtual reality (VR) headset, goggles, or glasses. According to another implementation, consumer devices 150a, 150b, and 150c may be utilized as promotional screens for items for sale sitting beside devices 150a, 150b, and 150c. This may include products that do not have a display screen such as a Wi-Fi router, home security device or other product that the retail location is offering for promotion and sale. Moreover, and as described in greater detail below by reference to FIG. 2, each of consumer devices 150a-150e may include a hardware processor, a memory, one or more transceivers, a display, one or more position/location sensors, audio input/output (I/O) features, and a front-facing or "selfie" camera.

Analogously, although retailing device 124 is shown as a tablet computer in FIG. 1, that representation is also merely exemplary. More generally, retailing device 124 may be any communications device capable of implementing data processing capabilities sufficient to provide a user interface, support connections to communication network 130, and implement the functionality ascribed to retailing device 124 herein. For example, in other implementations, retailing device 124 may take the form of a laptop computer, a smartphone, or a smart wearable device such as a smartwatch.

It is noted that, although the present application refers to touchless promotion software code 108 as being stored in memory 106 for conceptual clarity, more generally, memory 106 may take the form of any computer-readable non-transitory storage medium. The expression "computer-readable non-transitory storage medium." as used in the present application, refers to any medium, excluding a carrier wave or other transitory signal that provides instructions to hardware processor 104 of server computing platform 102, or to a hardware processor of any of consumer devices 150a-150e. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1 depicts touchless promotion software code 108 and reference database 110 as being co-located in memory 106, that representation is also provided merely as an aid to conceptual clarity. More generally, system 100 may include one or more server computing platforms 102, which may form an interactively linked but distributed system, such as a cloud-based system, for instance. As a result, hardware processor 104 and memory 106 may correspond to distributed processor and memory resources within system 100. In one such implementation, system 100 may correspond to one or more web servers, accessible over a packet-switched network such as the Internet, for example. That is to say, in some implementations, communication network 130 may include the Internet. Alternatively, or in addition, in some implementations, communication network 130 may include a local area network (LAN), a wide area network (WAN), or another type of limited distribution or private network.

In some implementations, retail environment 120 may be an indoor venue. For example, retail environment may be a big box retail store, a franchise store, a store located in a theme park, resort property, or shopping mall, or a kiosk located indoors in such a venue. Alternatively, in some implementations, retail environment 120 may be an outdoor venue. Examples of such outdoor venues include an open air store or kiosk, which may be located at a sports arena or stadium, a resort property, open air shopping mall, or a theme park, again to name merely a few.

Figure 2:
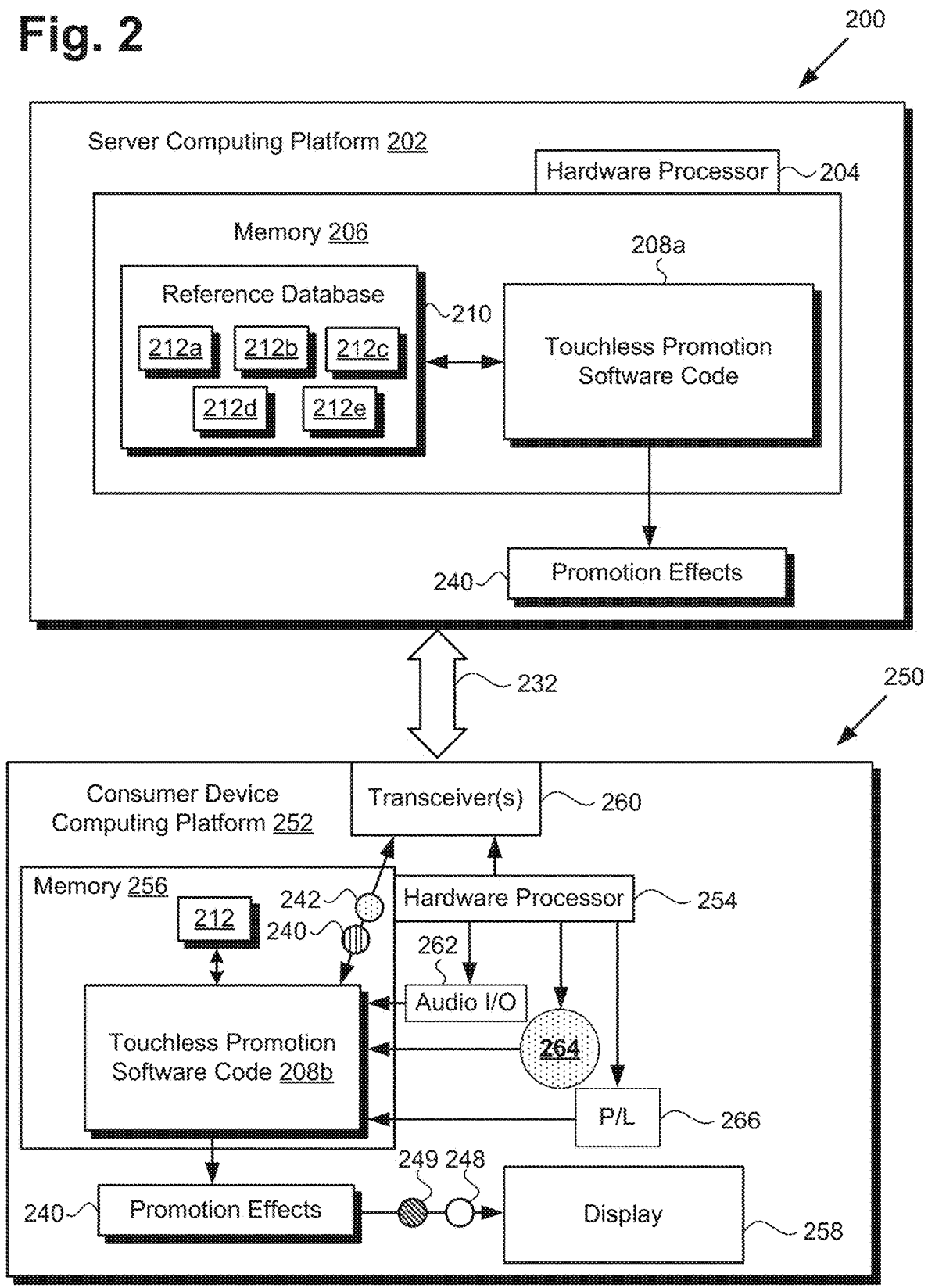
FIG. 2 shows a more detailed representation of an exemplary consumer device in combination with a server computing platform of a system, according to one implementation.

FIG. 2 shows a more detailed representation of exemplary consumer device 250 in combination with server computing platform 252 of system 200, according to one implementation. As shown in FIG. 2, consumer device 250 is communicatively coupled to server computing platform 252 by network communication link 232, which corresponds to network communication link 132 in FIG. 1. Server computing platform 202 includes hardware processor 204 and memory 206 implemented as a non-transitory storage device. As further shown in FIG. 2, memory 206 contains touchless promotion software code 208a and reference database 210 storing device data files 212a, 212b, 212c, 212d, and 212e (hereinafter "device files 212a-212e") each corresponding to a respective one of consumer devices 150a-150e, in FIG. 1.

Device file 212a may include one or more of a consumer interaction history, operating specifications, list of features, or a sanitization status of consumer device 150a, as well as specific pricing and promotional information for consumer device 150a. Analogously, device files 212b, 212c, 212d, and 212e may include one or more of a consumer interaction history, operating specifications, list of features, or a sanitization status of respective consumer devices 150b, 150c, 150d, and 150e, as well as specific pricing and promotional information for respective consumer devices 150b, 150c, 150d, and 150e.

Consumer device 250 includes consumer device computing platform 252 having hardware processor 254 and memory 256 implemented as a non-transitory storage device storing touchless promotion software code 208b and device file 212. As also shown in FIG. 2, consumer device 250 may include one or more transceivers 260 (hereinafter "transceiver(s) 260"), audio I/O features 262, one or more cameras 264 (hereinafter "camera(s) 264"), one or more position/location sensors 266 (hereinafter "P/L sensor(s) 266"), and display 258. Also shown in FIG. 2 are promotion effects 240 corresponding to any of promotion effects 140a, 140c, and 140e, in FIG. 1, as well as sanitization assurance message 248 and hygiene warning message 249.

Server computing platform 202 having hardware processor 204, and memory 206 storing touchless promotion software code 208a and reference database 210, corresponds in general to server computing platform 102 having hardware processor 104, and memory 106 storing touchless promotion software code 108 and reference database 110, in FIG. 1. Thus, server computing platform 202, hardware processor 204, memory 206, touchless promotion software code 208a, and reference database 210 may share any of the characteristics attributed to respective server computing platform 102, hardware processor 104, memory 106, touchless promotion software code 108, and reference database 110 by the present disclosure, and vice versa.

Consumer device 250 including display 258 corresponds in general to any of consumer devices 150a-150e including respective displays 158a-158e, in FIG. 1. That is to say, consumer device 250 may share any of the characteristics attributed to any one of consumer devices 150a-150e by the present disclosure, and vice versa, while display 258 may share any of the characteristics attributed to any one of displays 158a-158e by the present disclosure, and vice versa. Thus, although not shown in FIG. 1, like consumer device 250, each of consumer devices 150a-150e may include features corresponding to hardware processor 254, transceiver(s) 260, audio I/O features 262, camera(s) 264, P/L sensor(s) 266, and memory 256 storing touchless promotion software code 208b. Moreover, like consumer devices 150a-150e, consumer device 250 may take a variety of forms. In other words, like consumer devices 150a-150e, consumer device 250 may take the form of a tablet computer, a smartphone, a smart wearable item such as a smartwatch, a laptop computer, a smart TV, an e-reader, or a game console, for example.

Alternatively, in some implementations, consumer device 250 may take the form of an AR or VR headset, goggles, or glasses.

Transceiver(s) 260 may be implemented as wireless communication hardware and software enabling consumer devices 150a-150e/250 to exchange data with server computing platform 102/202 via network communication link 132/232 or to engage in peer-to-peer data exchange using inter-device wireless communication links 136. For example, transceiver(s) 260 may be implemented as fourth generation of broadband cellular technology (4G) wireless transceivers, or as 5G wireless transceivers configured to satisfy the IMT-2020 requirements established by the International Telecommunication Union (ITU). Alternatively, or in addition, transceiver(s) 260 may be configured to communicate via one or more of WiFi, Bluetooth, ZigBee, and 60 GHz wireless communications methods.

Audio I/O features 262 may include one or more microphones for receiving voice inputs, such as voice commands, for example. In addition, audio I/O features 262 may include one or more audio output components, such as audio speakers, for communicating instructions, promotional information, pricing information, or other information using sound.

Camera(s) 264 may include one or more red-green-blue (RGB) still image cameras or video cameras. Moreover, in some implementations, camera(s) 250 may correspond to an array of RGB (red-green-blue) still image or video cameras configured to generate a panoramic image of a venue, such as retail environment 120. It is noted that camera(s) 264 include at least one front-facing or "selfie" camera, which may be a still image camera or a video camera, configured to capture an image of the face of a consumer viewing the surface of one of displays 158a-158e/258.

Displays 158a-158e/258 may take the form of a touchscreen display, for example, and may be implemented as a liquid crystal display (LCD), a light-emitting diode (LED) display, an organic light-emitting diode (OLED) display, or using any other suitable display technology that performs a physical transformation of signals to light.

P/L sensor(s) 266 may include one or more accelerometers, or gyroscopes, or a GPS receiver, a magnetometer, or a biosensor, for example. In some implementations. P/L sensor(s) 266 may be implemented as an inertial measurement unit (IMU), as known in the art.

With respect to touchless promotion software code 208b, it is noted that in some implementations, touchless promotion software code 208b may be a thin client application of touchless promotion software code 108/208a. In those implementations, touchless promotion software code 208b may enable consumer devices 150a/150c/150e/250 to render promotion effects 140a/140c/140d/240 streamed or otherwise transmitted from server computing platform 102 on display 158a/158c/158e/258. However, in other implementations, touchless promotion software code 208b may include substantially all of the features of touchless promotion software code 108/208a, and may be capable of executing substantially all of the same functionality. That is to say, in some implementations, touchless promotion software code 208b corresponds to touchless promotion software code 108/208a and may share any of the features and perform any of the processes attributed to those corresponding features by the present disclosure.

According to the exemplary implementation shown in FIG. 2, touchless promotion software code 208b is located in memory 256 subsequent to transfer of touchless promotion software code 208b to consumer devices 150a-150e/250, over a packet-switched network such as the Internet, for example. Once present on consumer devices 150a-150e/250, touchless promotion software code 208b may be persistently stored in memory 256 and may be executed locally on consumer devices 150a-150e/250 by hardware processor 254. It is noted that device file 212 stored in memory 256 corresponds to one of device files 212a-212e stored in memory 206 of server computing platform 202 in a manner analogous to the correspondence between consumer device 250 and consumer devices 150a-150e. Thus, when consumer device 250 corresponds specifically to consumer device 150a, device file 212 corresponds to device file 212a; when consumer device 250 corresponds specifically to consumer device 150b, device file 212 corresponds to device file 212b; and so forth.

Continuing to refer to FIGS. 1 and 2 in combination, in the absence of a consumer interaction, consumer devices 150a-150e/250 may be in an idle mode and may playout the same content designed to attract consumer attention, also known in the art as an "attract loop," via respective displays 158a-158e/258. In one implementation, the attract loop is synchronized among devices in the store by server computing platform 102 to ensure the content is played in concert among multiple devices to create a pleasing multi-screen synchronized display. System 100 may be configured to synchronize the playout of the attract loop among consumer devices 150a-150e/250 so that each device playing the attract loop shows the same imagery or outputs the same audio at the same time when in idle mode. Playout of the attract loop is terminated, and playout of promotion effects specific to a particular consumer device is played out instead, when that consumer device receives an interaction input from a consumer. Optionally, software code 108/208a or 208b can be configured to overlay the promotion effects on top of the attract loop. This can provide a unique experience when the user is looking at the device to not eliminate the synchronized attract loop among devices while still displaying the promotion effects. If the consumer decides to interact with the device through touch, the attract loop is then ended, and only the promotion effects are displayed.

In the conventional art, the consumer input triggering playout of the promotional effects is a manual input, such as a touchscreen tap or gesture, requiring physical contact between the consumer and the device. In contrast to the conventional art, the present application advantageously enables a consumer to touchlessly trigger the transition from idle mode playout of the attract loop to playout of the promotional effects, and to engage in a substantive interaction with the consumer device without making physical contact with the consumer device.

In order to efficiently allocate computational resources, in some implementations it may be advantageous or desirable to distribute tasks between the computing resources of some of consumer devices 150a-150e/250 and server computing platform 102/202. For example, referring to FIG. 1, server computing platform 102 may be configured to synchronize playout of the attract loop on consumer devices 150b and 150d that are in idle mode, may detect the presence of interactive consumer 128a and 128b, and may identify and transmit promotion effects 140a and 140c to respective consumer devices 150a and 150c with which respective consumers 128a and 128b are interacting. By contrast, system 100 may rely on consumer device 150d with which consumer 128c is interacting to detect the interactions, as well as to identify and display promotion effects specific to consumer device 150d, such as its operating specifications, features, pricing information, and the like.

According to the present hygienic device interaction solution, touchless promotion software code 108/208a or 208b may be configured to control a front-facing camera included among camera(s) 264 of consumer device 150a-150e/250 to detect a face of a potentially interactive consumer, and to transition from idle mode playout of attract loop to display of promotion effects 240 when the consumer's face is detected. Thus, software code 108/208a or 208b may include one or more facial recognition algorithms for distinguishing a human face from other objects.

In some implementations, software code 108/208a or 208b may include a deep neural network capable of improving its facial recognition performance over time. As defined in the present application, a neural network, or NN, is a type of machine learning framework in which patterns or learned representations of observed data are processed using highly connected computational layers that map the relationship between inputs and outputs. A "deep neural network," in the context of deep learning, may refer to an NN that utilizes multiple hidden layers between input and output layers, which may allow for learning based on features not explicitly defined in raw data. Various forms of NNs may be used to make predictions about new data based on past examples or "training dataset." In various implementations, NNs may be trained as classifiers and may be utilized to perform image processing or natural-language processing. According to some implementations of the present concepts, the training dataset for ongoing training of software code 108/208a or 208b may be harvested from facial images captured within retail environment 120 over time.

Various criteria may be used to distinguish a potentially interactive consumer from a consumer merely walking past consumer device 150a-150e/250 or a consumer in the background of retail environment 120 that includes consumer device 150a-150e/250. For example, a face detected to be within a predetermined distance, such as approximately three feet, of consumer device 150a-150e/250 may be deemed a potentially interactive consumer by software code 108/208a or 208b, while a more distant face may not. In addition, or alternatively, a face that remains detectable for a threshold period of time, such as several seconds, may be deemed a potentially interactive consumer by software code 108/208a or 208b, while a more transient detected presence may not.

It is noted that software code 108/208a or 208b, when executed by respective hardware processor 104/204 or 254, may be designed to recognize a human face even when that human face is wearing a mask. It is further noted that, in some implementations, promotion effects 140a/140c/140e/240 displayed to an interactive consumer may depend on facial features detected of the consumer detected by software code 108/208a or 208b. For example, promotion effects 140a/140c/140e/240 for consumer device 150a/150c/150e/250 may be identified and displayed to a consumer based on whether the consumer is wearing a mask, or the apparent age or gender of the consumer. As another example, in use cases in which multiple faces are detected concurrently, promotion effects 140a/140c/140e/240 may include promotion and pricing for family service plans, or other group service plans, while detection of a single face may result in promotion of individual plans instead. As yet another example, where a consumer facial expression interpreted as expressing eagerness or excitement is detected, promotion effects 140a/140c/140e/240 may include promotion or pricing for upgraded service plans or device accessories.

In some implementations, software code 108/208a or 208b, when executed by respective hardware processor 104/204 or 254 may redirect a consumer interacting with one consumer device to another consumer device being promoted in retail environment 120. For example, where consumer 128a interactively engaged with consumer device 150a/250 expresses interest in features or services not available from consumer device 150a/250 but available from consumer device 150b/250, consumer device 150a/250 may redirect consumer 128a to alternative consumer device 150b/250. In some implementations, consumer device 150a/250 may direct consumer 128a to consumer device 150b/250 by identifying the location of consumer device 150b/250 in retail environment 120. Alternatively, in some implementations, consumer device 150a/250 may transmit activation prompt 146 to consumer device 150b/250 causing consumer device 150b/250 to announce its presence and location to consumer 128a, via a sound, a flashing light, or a flashing screen for example.

In use cases in which a consumer interacts with more than one consumer device being promoted in retail environment 120, the interaction history of the consumer may be used by system 100/200 to identify promotion effects for presentation to the consumer. For example, where consumer 128a is directed to consumer device 150b/250 by consumer device 150a/250 after an initial interaction with consumer device 150a/250, the promotional effects 240 presented to consumer 128a by consumer device 150b/250 may be selected so as to avoid repetition of promotional effects 140a/240 previously served to consumer 128a via consumer device 150a/250.

As noted above, the present hygienic device interaction solution advantageously enables a consumer to interact with consumer devices 150a-150e/250 touchlessly. For example, when the consumer's face is detected, promotion effects 140a/140c/140e/240 may include instructions to the consumer for providing inputs to consumer device 150a/150c/150e/250 as voice commands via audio I/O features 262, or as touchless head or hand gestures observable by the front-facing camera included among camera(s) 264. In some implementations, for example, software code 108/208a or 208b may maintain the front-facing camera in an active but low resolution or low frame rate mode until a consumer face is detected, and may then increase the resolution or frame rate to facilitate detection of subtle movements, gestures, or facial expressions by the consumer.

In some use cases, despite touchless interaction being enabled by the features of consumer devices 150a-150e/250 described above, a consumer may wish to make physical contact with one or more of consumer devices 150a-150e/250, for example to hold consumer devices 150a-150e/250 to evaluate their weights or form factors, or to experience haptic feedback resulting from physical interaction with consumer devices 150a-150e/250. In those use cases, the physical interaction of the consumer with consumer devices 150a-150e/250 may be sensed by software code 108/208a or 208b, for example based on touch or gesture inputs to a touchscreen or other control features of consumer devices 150a-150e/250, or based on movement of consumer devices 150a-150e/250 sensed by P/L sensor(s) 266. Moreover, in some implementations, software code 108/208a or 208b may utilize one or more accelerometers of P/L sensor(s) 266 to distinguish between a physical interaction with a consumer and a situation in which one or more of consumer devices 150a-150e/250 were to topple from a display stand without physical interaction with a consumer.

According to some implementations of the present hygienic device interaction solution, a consumer who wishes to physically interact with consumer devices 150a-150e/250 may be reassured that it is safe to do so by the presence of sanitization assurance message 248 on displays 158a-158e/258 of consumer devices 150a-150e/250. Alternatively, or in addition, a consumer who wishes to physically interact with consumer devices 150a-150e/250 may be warned not to do so by the presence of hygiene warning message 249 on displays 158a-158e/258 of consumer devices 150a-150e/250.

Figure 3:
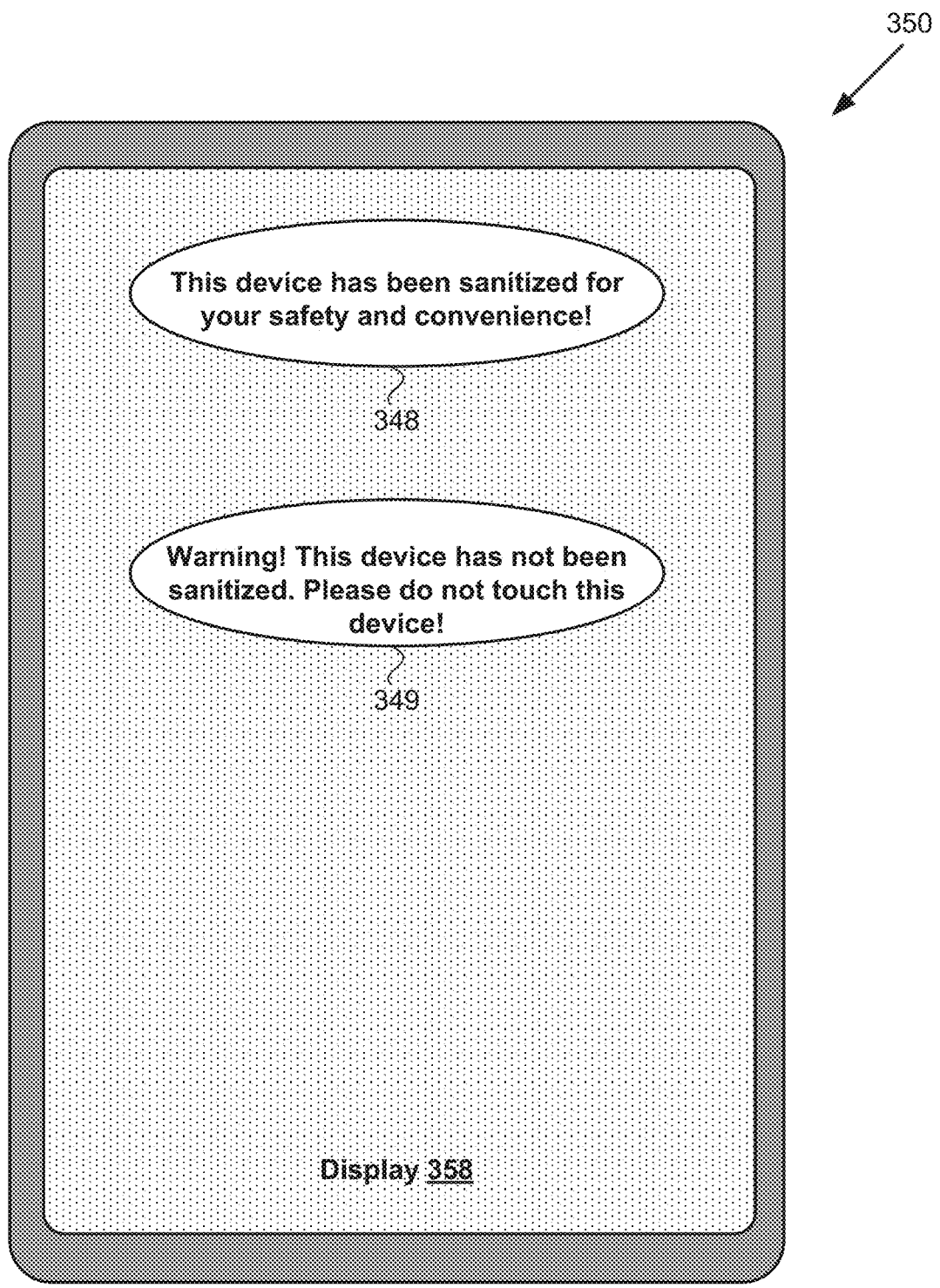
FIG. 3 shows an exemplary consumer device displaying a sanitization assurance message and a hygiene warning message.

FIG. 3 shows exemplary consumer device 350 displaying sanitization assurance message 348 and hygiene warning message 349. As shown in FIG. 3, in some implementations, sanitization assurance message 348 may appear on display 358 of consumer device 350 stating: "This device has been sanitized for your safety and convenience!" As also shown in FIG. 3, in some implementations, hygiene warning message 349 may appear on display 358 of consumer device 350 stating: "Warning! This device has not been sanitized. Please do not touch this device!" It is noted that the specific wording of sanitization assurance message 348 shown in FIG. 3, as well as the specific wording of hygiene warning message shown in that figure, is merely exemplary, and in various implementations, one or more different expressions for sanitization assurance message 348 or hygiene warning message 349 may be used.

It is further noted that consumer device 350 including display 358, sanitization assurance message 348, and hygiene warning message correspond in general to any of consumer devices 150a-150e/250 including respective displays 158a-158e/258, sanitization assurance message 248, and hygiene warning message 249, in FIGS. 1 and 2, and those corresponding features may share the characteristics attributed to any of the corresponding features by the present disclosure.

In some implementations, software code 208b, when executed by hardware processor 254 of consumer devices 150a-150e/250/350, may be configured to receive sanitization inputs, for example from retail employee 122, confirming that consumer devices 150a-150e/250/350 have been sanitized or are presently undergoing sanitization. In response to receiving those sanitization inputs, consumer devices 150a-150e/250/350 may persistently display sanitization assurance message 248/348, for example as an overlay to the attract loop when in idle mode, or as an overlay to promotion effects 140a/140c/140e/240, until a subsequent consumer interaction leading to possible contamination of consumer devices 150a-150e/250/350 is detected by software code 108/208a or 208b. For example, software code 208b may terminate display of sanitization assurance message 248/348 in response to sensing a physical interaction by a consumer with one of consumer devices 150a-150e/250/350.

In addition, where software code 108/208a or 208b identifies a device interaction with a consumer who is not wearing a mask, software code 108/208a or 208b may terminate display of sanitization assurance message 248/348 even when a physical interaction with the unmasked consumer has not been sensed. That enhanced level of caution where a consumer is not masked is due to the possibility that fluid droplets expelled by the unmasked consumer may have collected on the surface of one or more of consumer devices 150a-150e/250/350 despite absence of touching of the consumer device by the unmasked consumer. For similar reasons, even when the consumer interacting with consumer devices 150a-150e/250/350 is wearing a mask, software code 108/208a or 208b may terminate display of sanitization assurance message 248/348 when the consumer coughs, sneezes, or exhibits other respiratory symptoms during the interaction with one or more of consumer devices 150a-150e/250/350.

In some implementations, software code 108/208a or 208b may be configured to display sanitization assurance message 248/348 on the consumer device when the consumer device has been sanitized but not to display hygiene warning message 249/349 when the consumer device is or may be contaminated. In other implementations, software code 108/208a or 208b may be configured to display hygiene warning message 249/349 on the consumer device when the consumer device is or may be contaminated, but not to display sanitization assurance message 248/348 when the consumer device has been sanitized. In yet other implementations, software code 108/208a or 208b may be configured to display hygiene warning message 249/349 on the consumer device when the consumer device is or may be contaminated and to display sanitization assurance message 248/348 when the consumer device has been sanitized.

Re-sanitization of consumer device 150a-150e/250/350 after a consumer interaction may be prompted in more than one way. For example, in some implementations, retail employee 122 may be trained to actively monitor the display status of consumer devices 150a-150e/250/350 for the presence of sanitization assurance message 248/348 or hygiene warning message 249/349 and to re-sanitize any idle communication device not displaying sanitization assurance message 248/348 or displaying hygiene warning message 249/349. Alternatively, or in addition, retailing device 124 may be used to monitor the sanitization status of consumer devices 150a-150e/250/350 based on sanitization data 142 collected by system 100/200 from each of consumer devices 150a-150e/250/350. As another alternative, system 100/200 may be configured to issue sanitization alert 144 prompting retail employee 122 to re-sanitize one or more of consumer devices 150a-150e/250/350 based on sanitization data 142 received from consumer devices 150a-150e/250/350.

The indication that a consumer device has been sanitized can be specified by the retail employee 122 in several ways. One would be to indicate this on retailing device 124 by specifying the device position in the store or by using proximity sensors of retailing device 124 to consumer devices 150a-150e/250/350. Also, a custom gesture could be used as an input to consumer devices 158a-158e/250/350 that a particular device has been sanitized. Several options include a quadruple tap on the screen when the retail employee has a sanitized cloth in their hand, or a unique hand gesture in front of the camera such as "two thumbs up."

In addition to the features described above, in various implementations, software code 108/208a of server computing platform 102/202 may be configured to perform analytics to track key performance indicators (KPIs) for retail environment 120, or consumer behavior. Tracked consumer behavior may include the relative numbers of touch and touchless consumer interactions with consumer devices 150a-150e/250/350, mask wearing by consumers 128a-128c, the correlation of mask wearing with the popularity of individual consumer devices 150a-150e/250/350, the correlation of mask wearing with purchases of promoted consumer devices 150a-150e/250/350 or their associated services, or the correlation of mask wearing with re-sanitization rates for consumer devices 150a-150e/250/350. Alternatively, or in addition, software code 108/208a may be configured to perform analytics revealing enhanced product placement strategies. For example, where analytics performed by software code 108/208a reveal that a consumer who interacts with consumer device 150a/2501350 is likely to also interact with consumer device 150c/250/350, it may be advantageous or desirable to locate consumer devices 150a/250/350 and 150c/250/350 at opposite ends of retail environment 120 in order to expose consumers likely to interact with those devices to other products and services being promoted in retail environment 120.

Figure 4A:
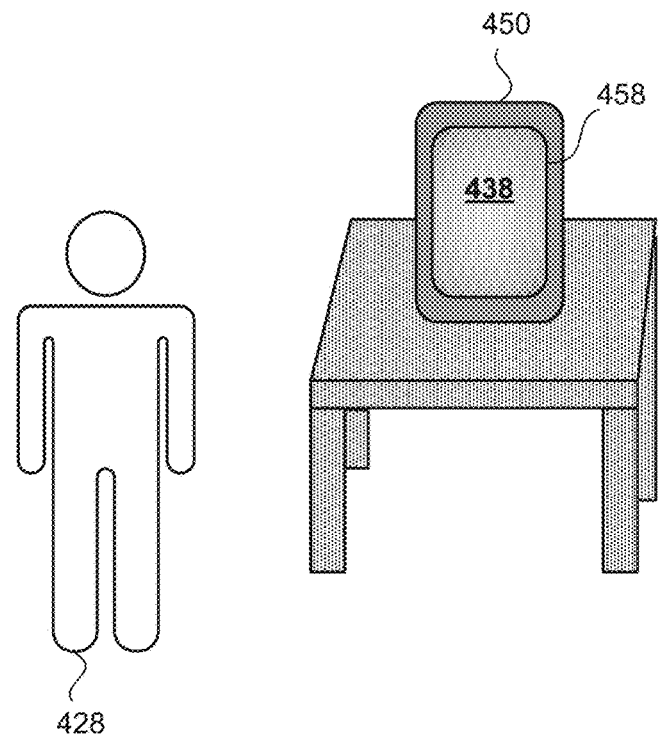
FIG. 4A shows an exemplary consumer device in a first mode, according to one implementation.
Figure 4B:
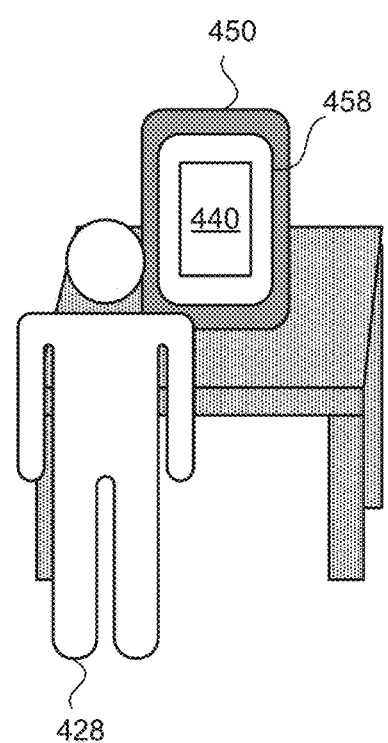
FIG. 4B shows an exemplary consumer device in a second mode, according to one implementation.
Figure 5A:
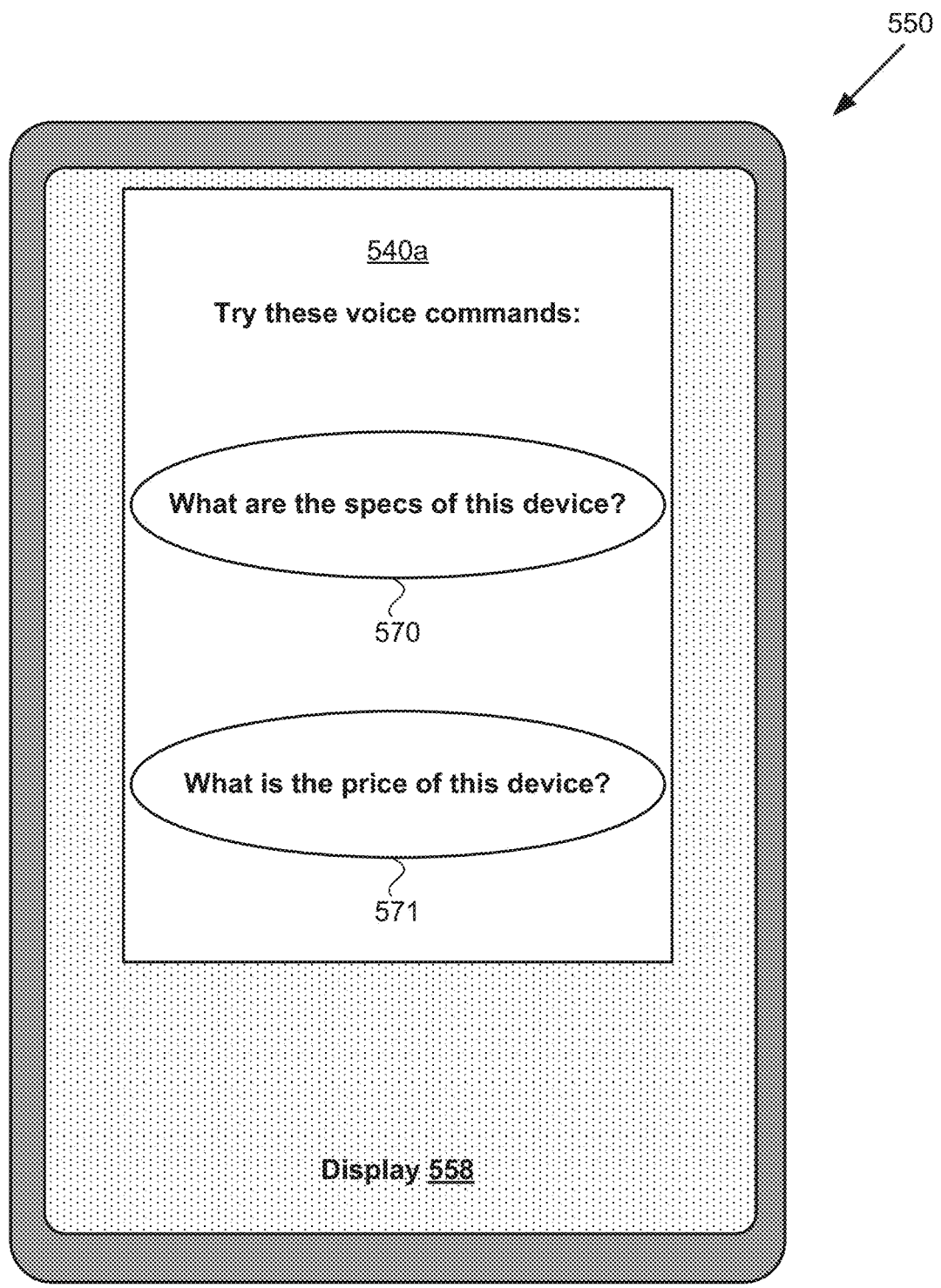
FIG. 5A shows an exemplary consumer device displaying content in a second mode, according to one implementation.
Figure 5B:
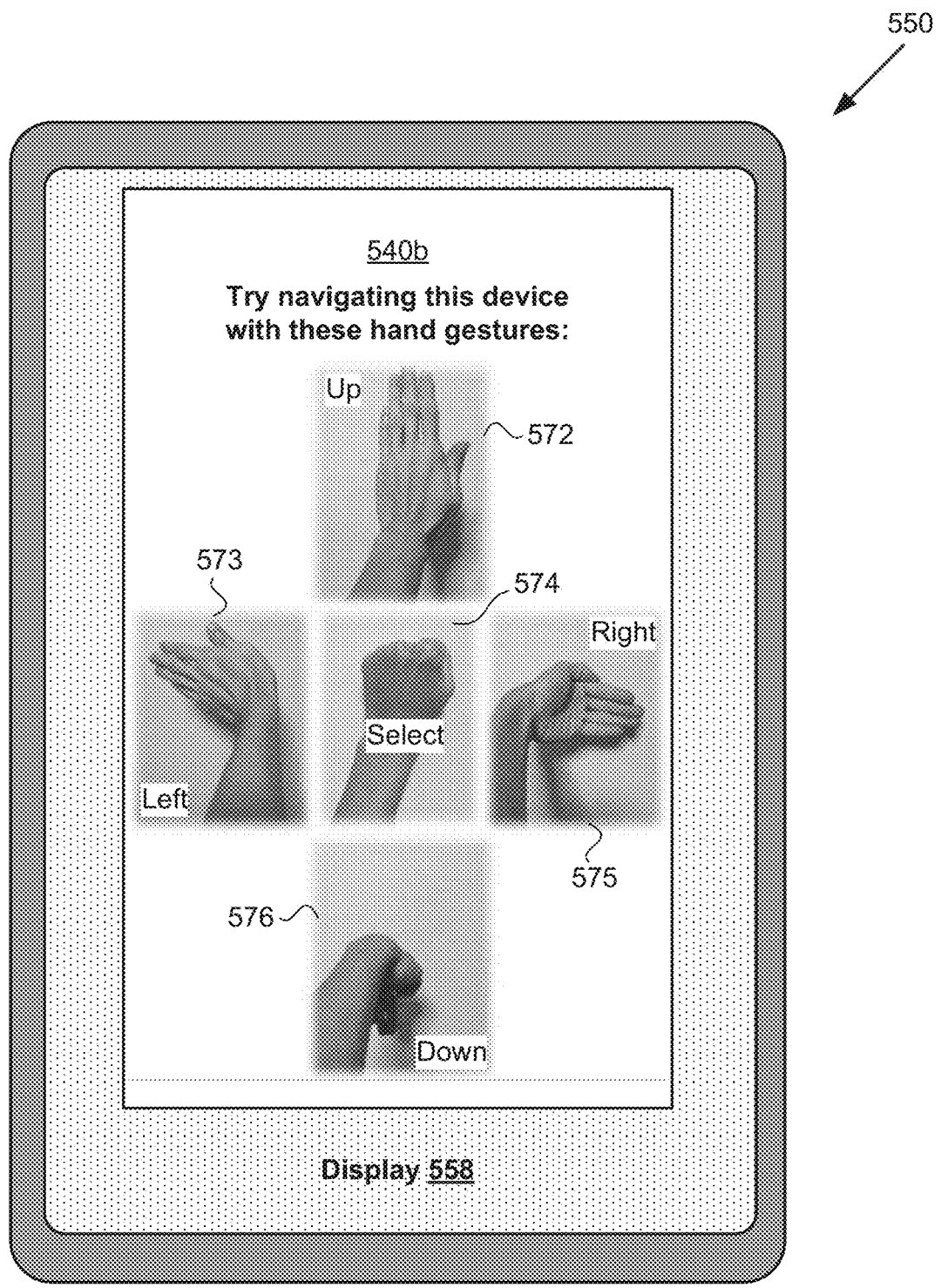
FIG. 5B shows an exemplary consumer device displaying content in a second mode, according to one implementation.
Figure 5C:
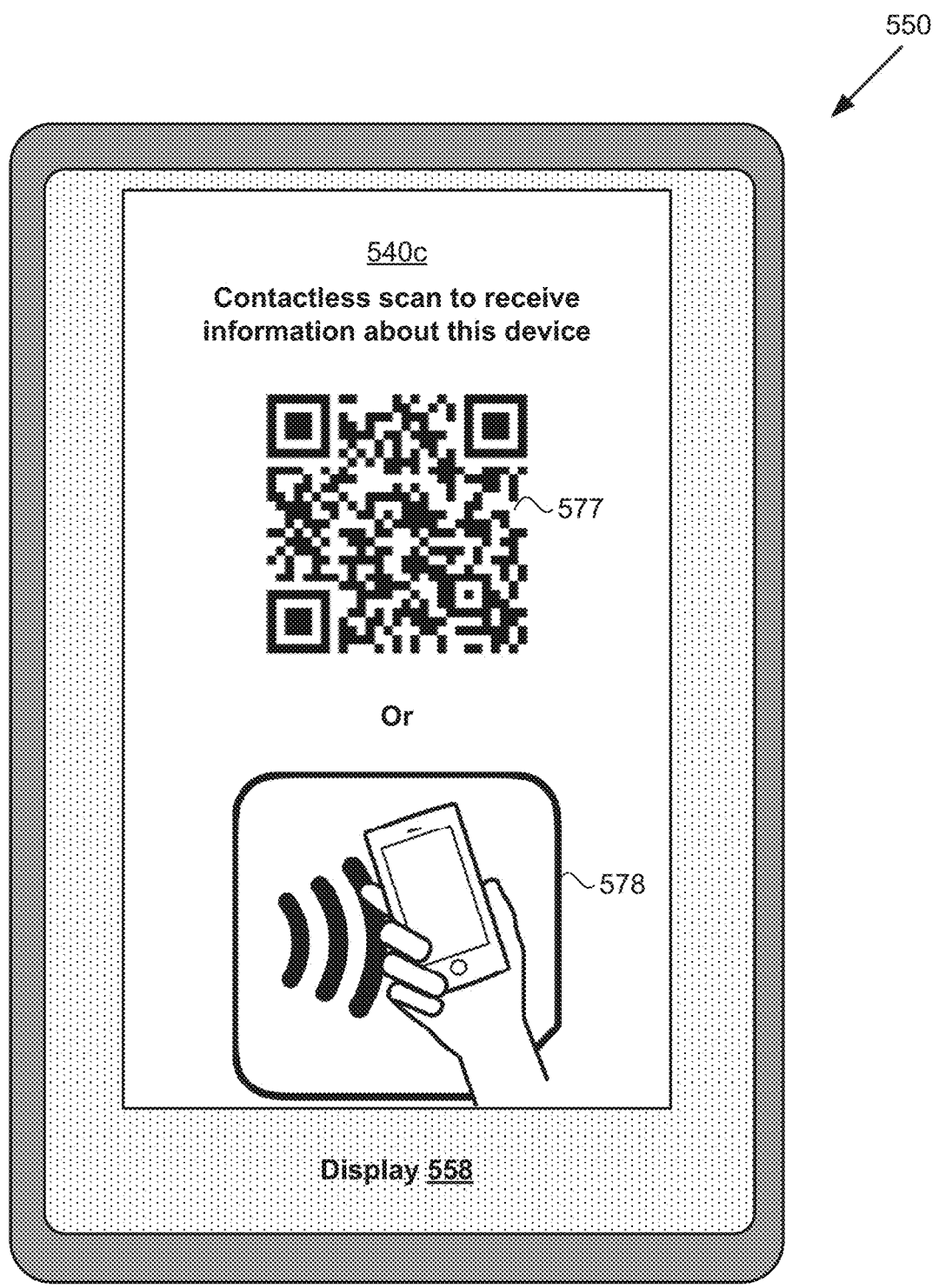
FIG. 5C shows an exemplary consumer device displaying content in a second mode, according to one implementation.

FIG. 4A shows exemplary consumer device 450 in a first mode, according to one implementation. FIG. 4B shows exemplary consumer device 450 in a second mode, according to one implementation. FIG. 5A shows exemplary consumer 550 device displaying content 540a in a second mode, according to one implementation. FIG. 5B shows exemplary consumer device 550 displaying content 540b in a second mode, according to one implementation. FIG. 5C shows exemplary consumer device 550 displaying content in a second mode, according to one implementation. Consumer device 450/550 in FIGS. 4A-5C generally correspond to any of consumer devices 150a-150e in FIG. 1 and consumer device 250 in FIG. 2, and may have any implementations or advantages described above. Consumer device 450/550 in FIGS. 4A-5C employs software code 108/208a or 208b in FIGS. 1 and 2, the functionality of which will be further described by reference to FIG. 6A.

Figure 6A:
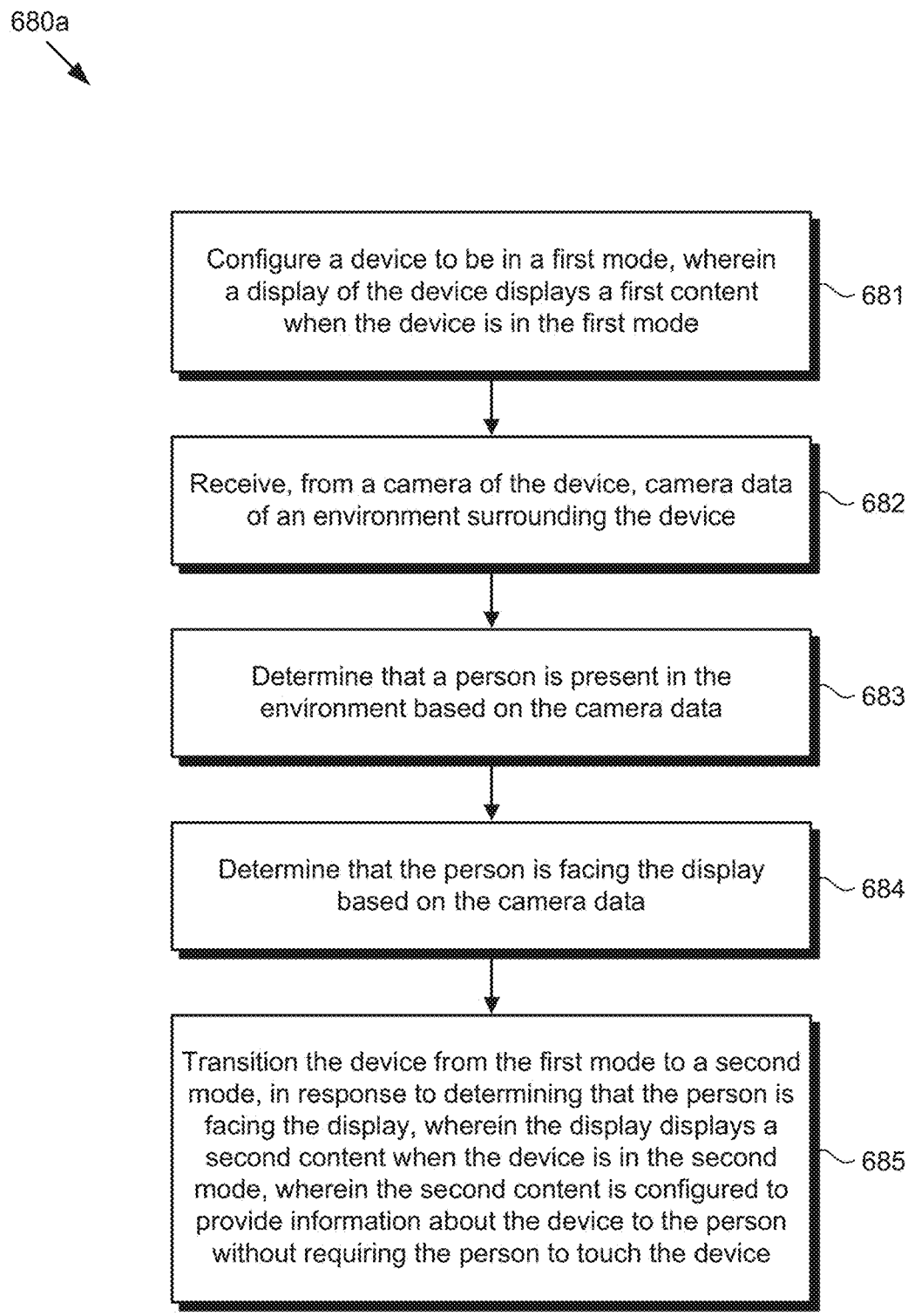
FIG. 6A shows a flowchart presenting an exemplary method of using the system of FIG. 1 for transitioning a device from a first mode to a second mode without requiring a person to touch the device, according to one implementation.

FIG. 6A shows flowchart 680a presenting an exemplary method of using system 100 of FIG. 1 for transitioning a device from a first mode to a second mode without requiring a person to touch the device, according to one implementation. With respect to the method outlined by FIG. 6A, it is noted that certain details and features have been left out of flowchart 680a in order not to obscure the discussion of the inventive aspects disclosed in the present application.

Referring to FIG. 6A in combination with FIG. 4A, flowchart 680a begins with configuring device 450 to be in a first mode, wherein display 458 of device 450 displays first content 438 when device 450 is in the first mode (action 681). Device 450 is configured in the first mode when device 450 does not detect a potentially interactive consumer. Device 450 may utilize data received from audio I/O features 262, camera(s) 264, or P/L sensor(s) 266 to determine whether consumer 428 is present in the environment, and whether consumer is potentially interactive. For example, in FIG. 4A, device 450 may utilize camera data of the environment surrounding device 450 from camera(s) 264 to determine that consumer 428 is not facing display 458, and device 450 may be in the first mode. In other examples, device 450 may utilize sensor data to determine that consumer 428 is not within a threshold distance of device 450 or not facing display 458 for a long enough period of time, and device 450 may be in the first mode.

Software code 108/208a or 208b, when executed by respective hardware processor 104/204 or 254, configures device 450 to exhibit a behavioral pattern in the first mode. In particular, as shown in FIG. 4A, in the first mode, device 450 displays a content or set of contents (hereinafter "first content") 438 using display 458. As described above, the first mode may an idle mode, and first content 438 may be imagery of an attract loop. First content 438 may also be designed to prevent display burn-in. Device 450 may also output audio as part of first content 438.

In various implementations, when in the first mode, device 450 may exhibit other behaviors associated with not detecting a potentially interactive consumer. For example, device 450 may enter a low power mode designed to reduce battery consumption or reduce heat generation by using power saving features like reduced processor speeds or reduced display brightness. As another example, audio I/O features 262, camera(s) 264, or P/L sensor(s) 266 may have a low resolution or low polling rate when device 450 is in the first mode. As yet another example, certain features, such as voice recognition and gesture recognition, may be disabled when device 450 is in the first mode, while other features, such as facial recognition, may be enabled.

Referring to FIG. 6A, flowchart 680*a* continues with receiving, from camera(s) 264 of device 450, camera data of the environment surrounding device 450 (action 682). As described above, camera(s) 264 may include one or more RGB still image or video cameras. Camera(s) 264 may also include panoramic or selfie cameras. Camera(s) 264 may also be implemented by an infrared camera. In one implementation, camera(s) 264 include and RGB-depth (RGB-D) camera that augments conventional images with depth information, for example, on a per-pixel basis.

Device 450 may be positioned such that camera(s) 264 can collect camera data of the environment surrounding device 450. For example, camera(s) 264 can include a selfie camera, and device 450 may be mounted below average adult height on a desk, table, or stand at a forty five degree angle, or mounted on a wall at average adult height at a ninety degree angle, such that camera(s) 264 is more likely to collect camera data of a face of consumer 428 as consumer 428 approaches. In one implementation, the position and angle of camera(s) 264 can be manually adjusted, for example, by employee 122 using an adjustable mount. In another implementation, the position and angle of camera(s) 264 can be automatically adjusted, for example, by software code 108/208*a* or 208*b* executed by respective hardware processor 104/204 or 254 in communication with an electronically controlled adjustable mount.

Camera data from camera(s) 264 can be processed by software code 108/208*a* or 208*b* executed by respective hardware processor 104/204 or 254 in a variety of manners as described elsewhere in the present application. Likewise, audio data can be received by audio I/O features 262 and position/location data can be received from P/L sensors 266, and can be processed in a variety of manners.

Referring to FIG. 6A, flowchart 680*a* continues with determining that a person is present in the environment based on the camera data (action 683). Software code 108/208*a* or 208*b* executed by respective hardware processor 104/204 or 254 can apply image recognition techniques using NNs to the camera data to discriminate a person from other objects in the environment. In one implementation, previously received camera data stored in memory 106/206 or 256 can be utilized to train software code 108/208*a* or 208*b* to recognize objects in the environment, such as permanent fixtures, in order to better discriminate a person from other objects in the environment. For example, software code 108/208*a* or 208*b* executed by respective hardware processor 104/204 or 254 can assign a higher or lower likelihood that camera data corresponds to a person when features in the camera data are less similar or more similar to previously recognized objects in the environment. Thus, software code 108/208*a* or 208*b* can determine that consumer 428 in FIG. 4A is present in the environment based on camera data. In various implementations, the determination that consumer 428 is present in the environment may also be based on audio data and position/location data.

Referring to FIG. 6A, flowchart 680*a* continues with determining that the person is facing the display based on the camera data (action 684). For example, in FIG. 4B, consumer 428 is now facing display 458 of device 450. As described above, software code 108/208*a* or 208*b*, when executed by respective hardware processor 104/204 or 254, may be designed to recognize a human face even when that human face is wearing a mask. Software code 108/208*a* or 208*b* can utilize the camera data in conjunction with the recognized face to determine if consumer 428 is facing display 458. In one implementation, software code 108/208*a* or 208*b* determines that consumer 428 is facing display 458 by determining, based on the camera data, that the recognized face of consumer 428 is within a threshold distance of device 450. For example, software code 108/208*a* or 208*b* may apply trigonometric algorithms to, or correlate depth information with, camera data corresponding to the recognized face, and thereby determine a distance between device 450 and the recognized face. A recognized face within a threshold distance of device 450, such as within approximately three feet, may be deemed to be facing display 458. Recognized faces outside the threshold distance may be deemed to not be facing display 458.

In one implementation, software code 108/208*a* or 208*b* determines that consumer 428 is facing display 458 by determining, based on the camera data, that the recognized face occupies a threshold pixel area. The pixel area of a recognized face in camera data is generally greater when the corresponding consumer 428 is closer to camera(s) 264. Similarly, the pixel area of a recognized face in camera data is generally greater when the corresponding consumer 428 is facing camera(s) 264, and is generally less when the corresponding consumer 428 is facing aside or otherwise not directly facing camera(s) 264. The pixel area of a recognized face may be expressed as a percentage of the total pixel area of the camera data. When the percentage is greater than a predetermined threshold, the recognized face may be deemed to be facing display 458. Recognized faces less than the threshold pixel area may be deemed to not be facing display 458.

In another implementation, software code 108/208*a* or 208*b* determines that consumer 428 is facing display 458 by determining, based on the camera data, that the recognized face remains recognizable for a threshold time period. For example, software code 108/208*a* or 208*b* may be configured to track a time period the face remains recognizable (also referred to herein as "linger time") and store that information in memory 106/206 or 256. A longer linger time generally increases the likelihood that consumer 428 desires to interact with device 450. A recognized face with a linger time longer than a threshold time period, such as longer than approximately three seconds, may be deemed to be facing display 458. Recognized faces with shorter linger times may be deemed to not be facing display 458.

In yet another implementation, software code 108/208*a* or 208*b* determines that consumer 428 is facing display 458 by tracking, based on the camera data, a gaze or an eye of the consumer 428. For example, software code 108/208*a* or 208*b* can apply eye tracking techniques using NNs to the camera data to track where the eye is looking. The eye tracking data can be correlated with information regarding display 458 stored in memory 106/206 or 256, such as a distance between camera(s) 264 and display 458 or a size of display 458, in order to determine that consumer 428 is facing display 458.

In one implementation, multiple techniques of determining that consumer 428 is facing display 458 may be utilized as alternatives. For example, software code 108/208*a* or 208*b* may alternate determining that consumer 428 is facing display 458 using threshold distance, threshold pixel area, threshold linger time, or eye tracking as alternatives, and then correlate KPIs with the technique used as an indication of its efficacy. Such KPIs can include, for example, how often consumers interact in response to a determination that they were facing display 458, the number of any such interactions that occurred, and how often consumers purchase device 450 in response to a determination that they were facing display 458. In another implementation, multiple techniques of determining that consumer 428 is facing display 458 may be utilized as a combination. For example, software code 108/208*a* or 208*b* may require both eye tracking and threshold linger time to indicate consumer 428 is facing display 458, in order to determine that consumer 428 is facing display 458.

Determining that consumer 428 is facing display 458 based on camera data indicates consumer 458 is potentially interactive with device 450. However, software code 108/208*a* or 208*b* can also determine that consumer 458 is potentially interactive in a variety of manners, instead of or in addition to determining that consumer 428 is facing display 458. Software code 108/208*a* or 208*b* can determine that consumer 458 is potentially interactive based on audio data from audio I/O features 262 and position/location data from P/L sensor(s) 266. For example, consumer 428 speaking the voice command "Wake up" may indicate consumer 428 is potentially interactive. As another example, position/location data distinguished as intentional physical movement of a display stand by consumer 428, rather than an unintentional or insignificant interaction such as toppling from a display stand, may indicate consumer 428 is potentially interactive. In various implementations, multiple techniques of determining that consumer 428 is potentially interactive may be utilized as a combination. For example, software code 108/208*a* or 208*b* may require both a determination that consumer 428 is facing display 458 based on camera data and a determination that consumer 428 intentionally moved a display stand based on position/location data, in order to determine that consumer 428 is potentially interactive.

Referring to FIG. 6A in combination with FIG. 4B, flowchart 680*a* concludes with transitioning device 450 from the first mode to a second mode, in response to determining that the person is facing display 458, wherein display 458 displays second content 440 different than first content 438 when device 450 is in the second mode, wherein second content 440 is configured to provide information about device 450 to the person without requiring the person to touch device 450 (action 685).

In FIG. 4B, device 450 is now in a second mode. Software code 108/208*a* or 208*b*, when executed by respective hardware processor 104/204 or 254, configures device 450 to exhibit a different behavioral pattern in the second mode. In particular, as shown in FIG. 4B, in the second mode, device 450 displays second content 440 using display 458. The second mode may be a promotional mode. Second content 440 can be configured to provide information about device 450 to the consumer 428. For example, second content 440 can include instructions to consumer 428 for providing inputs to device 450. In other examples, second content 440 can include information about device 450, such as operating specifications, list of features, sanitization status, pricing information, promotional video, or device services available from retail environment 120. Second content 440 can generally include any of promotion effects 140*a*/140*c*/140*e*/240.

Second content 440 can also include other information or effects in addition to information about device 450. For example, second content 440 can also include a greeting. Device 450 may also output audio, video, or imagery as part of second content 440. Other examples of second content 440 are described further below.

Notably, according to the present implementation, transitioning from the first mode to the second mode and displaying second content 440 providing information about device 450 can occur without requiring consumer 428 to touch device 450. In the present implementation, device 450 is configured to transition to the second mode in response to determining that consumer 428 is facing display 458. In another implementation, device 450 is configured to transition to the second mode in response to detecting a potentially interactive consumer.

In various implementations, when in the second mode, device 450 may exhibit behaviors in addition to displaying second content 440, such as behaviors associated with detecting a potentially interactive consumer. For example, device 450 may enter a high power mode designed to increase performance by using features like increased processor speeds or increased display brightness. As another example, display 258/458, audio I/O features 262, camera(s) 264, or P/L sensor(s) 266 may have a high resolution or high polling rate when device 450 is in the second mode. As yet another example, certain features, such as voice recognition and gesture recognition, may be enabled when device 450 is in the second mode, while other features, such as facial recognition, may be disabled or have reduced polling rate.

FIG. 5A shows device 550 displaying second content 540*a* in a second mode, according to one implementation. As shown in FIG. 5A, device 550 displays second content 540*a* using display 558. Device 550, display 558, and second content 540*a* in FIG. 5A generally correspond to device 450, display 458, and second content 440 respectively in FIG. 4B.

Second content 540*a* in FIG. 5A includes instructions for utilizing voice commands as input to device 550. In particular, second content 540*a* displays the message "Try these voice commands:" in conjunction with the wording of voice command 570 "What are the specs of this device?" and voice command 571 "What is the price of this device?" Software code 108/208*a* or 208*b* executed by respective hardware processor 104/204 or 254 can apply voice recognition techniques using NNs to received audio data to determine whether a consumer in the environment has spoken one of voice commands 570/571. In various implementations, audio I/O features 262 are only enabled or voice recognition subroutines are only executed in response to determining that consumer 428 is facing display 458/558 (i.e., after action 684 in FIG. 6A) or determining that consumer 428 is potentially interactive, when device 550 is in the second mode.

In one implementation, software code 108/208*a* or 208*b* can discriminate the voice of consumer 428 versus the voice of another consumer in the environment as a precondition to executing a recognized voice command. In this implementation, software code 108/208*a* or 208*b* can determine decibel levels associated with recognized words based on audio data, and discriminate the voice of consumer 428 versus the voice of another consumer in the environment based on the decibel levels. For example, when a peak decibel level or an average decibel level for a recognized word or a recognized set of words in voice command 570/571 is greater than a threshold decibel level, software code 108/208a or 208b may determine that voice command 570/571 was spoken by a potentially interactive consumer, such as consumer 428 facing display 458/558, and may execute the corresponding voice command 570/571. Likewise, when the peak decibel level or the average decibel level is less than the threshold decibel level, software code 108/208a or 208b may determine that the voice command 570/571 was spoken by another consumer in the environment, and may avoid executing the corresponding voice command 570/571.

In response to determining that consumer 528 has spoken one of voice commands 570/571, device 550 can execute or otherwise appropriately respond to the corresponding voice commands 570/571. For example, display 558 may display operating specifications in response to voice command 570 and may display pricing information in response to voice command 571. It is noted that second content 540a and voice commands 570/571 in FIG. 5A are merely exemplary. For example, second content 540a may display different messages as instructions for utilizing voice commands. Software code 108/208a or 208b may be configured to recognize and display more voice commands than the two voice commands 570/571.

FIG. 5B shows device 550 displaying second content 540b in a second mode, according to one implementation. As shown in FIG. 5B, device 550 displays second content 540b using display 558. Second content 540b in FIG. 5B includes instructions for utilizing touchless gestures as input to device 550. In particular, second content 540b displays the message "Try navigating this device with these hand gestures:" in conjunction with the imagery of touchless gestures 572-576 and messages of their corresponding functions.

Software code 108/208a or 208b executed by respective hardware processor 104/204 or 254 can apply gesture recognition techniques using NNs to received camera data to determine whether a consumer in the environment has made one of touchless gestures 572-576. In various implementations, gesture recognition subroutines are only executed in response to determining that consumer 428 is facing display 458/558 (i.e., after action 684 in FIG. 6A) or determining that consumer 428 is potentially interactive, when device 550 is in the second mode. As described above, camera(s) 264 may increase resolution or frame rate when device 550 is in the second mode to facilitate detection of touchless gestures 572-576.

In one implementation, software code 108/208a or 208b can discriminate the gesture of consumer 428 versus the gesture of another consumer in the environment as a precondition to executing a corresponding function. In this implementation, software code 108/208a or 208b can determine a distance or a pixel area associated with a recognized gesture based on camera data, and discriminate the gestures of consumer 428 versus the gestures of another consumer in the environment based on the distance or the pixel area. For example, when the distance or the pixel area for a recognized gesture in touchless gestures 572-576 is greater than a threshold distance or a threshold pixel area, software code 108/208a or 208b may determine that the recognized gesture was made by a potentially interactive consumer, such as consumer 428 facing display 458/558, and may execute a corresponding function. Likewise, when the distance or the pixel area is less than the threshold distance or the threshold pixel area, software code 108/208a or 208b may determine that the recognized gesture was made by another consumer in the environment, and may avoid executing the corresponding function.

In response to determining that consumer 428 has made one of touchless gestures 572-576, device 550 can execute a corresponding function or otherwise appropriately respond to the touchless gestures 572-576. For example, display 558 may navigate up in response to touchless gesture 572, such as by screen scrolling or moving a cursor or a highlight. Likewise, display 558 may navigate left in response to touchless gesture 573, right in response to touchless gesture 575, and down in response to touchless gesture 576. As another example, display 558 may select or enter a displayed element in response to touchless gesture 574. Some examples of displayed elements that can be selected include yes/no confirmation buttons, back/forward redirect buttons, list expand/collapse buttons, and Uniform Resource Identifier (URI) links. It is noted that second content 540b and touchless gestures 572-576 in FIG. 5B are merely exemplary. For example, second content 540b may display different messages as instructions for utilizing touchless gestures. Software code 108/208a or 208b may be configured to recognize and display more touchless gestures than the five touchless gestures 572-576. Software code 108/208a or 208b may be configured to recognize head gestures in addition to hand gestures. Such recognizable head gestures may include tilting up, down, left, or right, shaking between left and right, nodding between up and down, and bobbing between back and forth.

FIG. 5C shows device 550 displaying second content 540c in a second mode, according to one implementation. As shown in FIG. 5C, device 550 displays second content 540c using display 558. Second content 540c in FIG. 5C includes instructions for utilizing contactless scan as input to device 550. In particular, second content 540c displays the message "Contactless scan to receive information about this device" in conjunction with the imagery of quick response (QR) code 577 and near-field communication (NFC) or radio-frequency identification (RFID) icon 578. Consumer 428 can interact with second content 540c using scanning techniques known in the art. For example, consumer 428 can scan QR code 577 using a camera of a personal device. As another example, consumer can bring an NFC or RFID tag of a personal device in range of an NFC or RFID tag of device 550.

In response to determining that consumer 428 has scanned QR code 577 or device 550, software code 108/208a or 208b executed by respective hardware processor 104/204 or 254 can execute a corresponding function or otherwise appropriately respond to the scan to provide information about device 550 to consumer 428. For example, in response to the scan, information about device 550, such as operating specifications, list of features, sanitization status, pricing information, promotional video, or device services available from retail environment 120, can be displayed on display 558 or transferred to the consumer's personal device.

In other examples, software code 108/208a or 208b may receive information about the personal device of consumer 428 directly as part of the scan, or may derive information about the personal device of consumer 428 indirectly using a device ID or a model number received as part of the scan. Then software code 108/208a or 208b may generate a differences list comparing information about device 550 against information about the personal device of consumer 428. The difference list may include differences in operating specifications, features, pricing information, or device services available from retail environment 120. The differences list can be displayed on display 558 or transferred to the consumer's personal device. Information transferred to the consumer's personal device may be stored or displayed thereon. Display 558 may display a confirmation message describing that information was transferred the consumer's personal device.

With respect to the method outlined by FIG. 6A, it is noted that certain details and features have been left out of flowchart 680*a* in order not to obscure the discussion of the inventive aspects disclosed in the present application. Methods according to the present application may include more or fewer actions than the five actions 681-685 in flowchart 680*a*. In various implementations, software code 108/208*a* or 208*b* executed by respective hardware processor 104/204 or 254 can transition device 450/550 from the second mode to the first mode when consumer 428 is no longer facing display 458, moves a threshold distance away from device 450, or is otherwise no longer deemed potentially interactive. In one implementation, software code 108/208*a* or 208*b* can transition device 450/550 from the second mode to a third mode after displaying information about device 450/550.

In one implementation, device 450/550 includes a temperature sensor configured to collect temperature data regarding the temperature of device 450/550. Software code 108/208*a* or 208*b* may utilize such temperature data when determining whether to transition to the second mode, in order to account for temperature increases attributable to previous consumer interactions with device 450/550. For example, when device 450/550 has recently returned to the first mode from the second mode, device 450/550 may have recently experienced several consumer interactions resulting in increased use of hardware processor 254 or display 258/458/558. Thus, device 450/550 may be at a high temperature and at risk of overheating. Accordingly, software code 108/208*a* or 208*b* may impose stricter requirements as preconditions for subsequent transitions to the second mode based on the temperature of device 450/550, since operating in the second mode may be likely to result in further heat generating consumer interactions. In particular, the temperature of device 450/550 increases, software code 108/208*a* or 208*b* may dynamically decrease the threshold distance, increase the threshold pixel area or the threshold linger time, or impose stricter eye tracking requirements.

In one implementation, software code 108/208*a* or 208*b* executed by respective hardware processor 104/204 or 254 can generate position suggestions or angle suggestions. For example, software code 108/208*a* or 208*b* can track KPIs related to the efficacy of facial recognition. Such KPIs can include, for example, how often facial recognition recognized a face, a face likelihood score assigned to a pixel area of camera data even though a face was not recognized, and estimated likelihood scores that a face would be recognized if camera(s) 264 were positioned/angled differently. Software code 108/208*a* or 208*b* can generate position suggestions or angle suggestions based on these facial recognition KPIs. For example, software code 108/208*a* or 208*b* can generate position suggestions or angle suggestions if facial recognition fails to recognize a threshold number of faces per a predetermined number of images in camera data, or per a predetermined time period of images in camera data.

As another example, if facial likelihood scores are below a threshold likelihood score needed to recognize a face, but are within a predetermined error margin, software code 108/208*a* or 208*b* can generate position suggestions or angle suggestions. In one implementation, facial likelihood scores may need to be within the error margin with a predetermined frequently to justify generating suggestions. In another implementation, an average of facial likelihood scores can be compared to the error margin. In yet another implementation, the error margin can be compared to a weighted average of facial likelihood scores that assigns greater weight to likelihood scores closer to the threshold likelihood score needed to recognize a face.

As yet another example, if facial recognition indicates camera data contains a greater number of chins than expected, software code 108/208*a* or 208*b* may suggest positioning camera(s) 264 higher, or propping up or angling the associated device closer to vertical. In contrast, if facial recognition indicates camera data contains greater number of foreheads, software code 1081208*a* or 208*b* may suggest positioning camera(s) 264 lower, or angling the associated device closer to level. In a similar manner, if facial recognition indicates camera data contains greater pixel areas for certain facial sides than expected, such as greater pixel areas for left side cheeks or greater pixel areas for right side eyes, software code 108/208*a* or 208*b* may suggest pivoting camera(s) 264 or the associated device to angle more left or more right.

It is noted that generated position suggestions or angle suggestions can be generic, simply recommending a change, or can be specific, recommending a change in a particular direction or towards a particular angle. Further, position suggestions or angle suggestions can be generated with respect to camera(s) 264 or with respect to the associated device. Position suggestions or angle suggestions may be further based on position/location data from P/L sensor(s) 266.

Software code 108/208*a* or 208*b* executed by respective hardware processor 104/204 or 254 can transmit position suggestions or angle suggestions to retailing device 124 for display through display 126 to employee 122. Employee 122 can then manually adjust the relevant camera or device 150*a*/150*b*/150*c*/150*d*/150*e*. Alternatively, software code 108/208*a* or 208*b* executed by respective hardware processor 104/204 or 254 can transmit position suggestions or angle suggestions to an electronically controlled adjustable mount (not shown) in order to automatically adjust the relevant camera or device 150*a*/150*b*/150*c*/150*d*/150*e*.

As described above, facial recognition does not necessarily require generation or retention of PII, and facial recognition may be performed even when the consumer is wearing a mask. However, in various implementations, the systems and software disclosed in the present application may be configured to generate PH based on camera data from camera(s) 264 or based on audio data from audio I/O features 262, store PII in memory 106/206 or 256, and perform a variety of actions based on the PII and detection of the presence of a potentially interactive consumer. For example, referring to FIG. 1, by comparing recognized facial features from camera data of devices 150*a*-150*e* against PII stored in memory 106/206 or 256, system 100 can uniquely track consumers 128*a*-128*c* throughout retail environment 120.

Software code 108/208*a* or 208*b* may correlate PH with a determination that consumer 128*a*/128*b*/128*c* is facing display 158*a*/158*b*/158*c*/158*d*/158*e* (e.g., action 684 in FIG. 6A) or with a determination that consumer 128*a*/128*b*/128*c* is potentially interactive with device 150*a*/150*b*/150*c*/150*d*/150*e*, in order to provide a unique experience. For example, consumer 128*a* may be deemed potentially interactive with device 150*a*. Device 150*a* may gather PH from its camera data or audio data. This information may be assigned a personal identifier and associated together, for example, in reference database 110/210. After finishing interacting with device 150a, consumer 128a may walk over to device 150e. When device 150e detects the presence of consumer 128a based on its camera data, device 150e may also detect PH of consumer 128a, and perform a lookup to determine whether it matches previously stored PH. If a match is found, other previous information about consumer 128a gathered by device 150a may be transferred to device 150e.

In one implementation, if consumer 128a was facing or potentially interactive with device 150a, device 150e may determine that consumer 128a is more likely to face or potentially interact with device 150e. In other words, if the method outlined by flowchart 680a in FIG. 6A were performed with respect to device 150a, and then repeated with respect to device 150e, software code 108/208a or 208b may adjust an algorithm utilized for action 684 when the method is repeated, such that consumer 128a is more likely to be determined to be facing display 158e of device 150e. In particular, software code 108/208a or 208b may increase the threshold distance, decrease the threshold pixel area or the threshold linger time, or relax eye tracking requirements.

Referring to FIG. 4B, in one implementation, second content 440 is customized based on the PII of consumer 428. For example, second content 440 can include a customized greeting. As another example, second content 440 can include pricing information tailored to consumer 428. As consumer 428 is tracked through the environment using PII, subsequent devices transitioning to the second mode may skip portions of second content 440 or other promotional effects already presented to consumer 428. Continuing the above example where, after finishing interacting with device 150a, consumer 128a walks over to device 150e, device 150a can output a customized greeting while device 150e does not.

Referring to FIG. 5C, as described above, in response to consumer 428 scanning QR code 577 or an NFC or RFID tag of device 550, software code 108/208a or 208b may generate a differences list comparing information about device 550 against information about the personal device of consumer 428. As consumer 428 is tracked through the environment and scans additional devices, information about the additional devices may be added to the differences list. In one implementation, in order to reduce visual clutter when the differences list is displayed to the consumer, only a predetermined number of the most recently scanned devices, such as the two most recently scanned devices, are kept on the differences list while other earlier scanned devices are removed. In an alternative implementation, recently scanned devices that are not already on the differences list are added at the top or front of the differences list, while recently scanned devices that are already on the differences list are moved from their current position to the top or front of the differences list.

Referring to FIG. 1, as described above, system 100 may be configured to track KPIs related to consumer behavior, such as the relative numbers of touch and touchless consumer interactions with devices 150a-150e, mask wearing by consumers 128a-128c, the correlation of mask wearing with purchases of devices 150a-150e or their associated services. These KPIs can be combined with PII sort the KPIs by individual consumers or by demographic groups.

It is noted that employee 122 may also be uniquely tracking in retail environment 120 using PII. In one implementation, retailing device 124 is configured allow tagging of a personal identifier or other entry in reference database 110/210 as belonging to employee 122. Retailing device 124 may require authentication, such as by an employee password or other credentials, before allowing tag inputs. When devices 150a-150e detect the presence of a person based on their camera data, devices 150a-150e may also detect PII of the person, and perform a lookup to determine whether it matches previously stored PII tagged as belonging to employee 122. If a match belonging to employee 122 is found, devices 150a-150e may avoid transitioning to the second mode. In other words, referring to FIG. 6A, between actions 683 and 685, flowchart 680a may include an action that includes checking whether the person is an employee based on PII in the camera data and based on an employee tag input.

Retailing device 124 may also utilize tags to create analytics groups. For example, recorded behavior tagged as belonging to an employee may be automatically removed from KPIs or datasets generated for tracking consumer analytics. Alternatively, recorded behavior tagged as belonging to an employee may be automatically included in KPIs or datasets generated for employee performance reviews. Other tags besides an employee tag may also be utilized to create custom analytics groups.

In one implementation, as consumers 128a-128c are tracked through retail environment 120 using PII, system 100 may generate traffic patterns based on the tracking. Software code 108 may generate and automatically update a map of retail environment 120 including the traffic patterns as well as the locations of devices 150a-150e in retail environment 120 reported by P/L sensor(s) 266 in FIG. 2. Software code 108 may store the map in memory 106, and display the map on display 126 of retailing device 124. In this implementation, determining that consumer 128a/128b/128c is facing display 158a/158b/158c/158d/158e (e.g., action 684 in FIG. 6A), or determining that consumer 128a/128b/128c is potentially interactive, may be partially based on the position/location of devices 150a-150e or the consumer traffic patterns.

For example, referring to FIG. 1, assuming consumers 128a and 128c have the same positioning relative to devices 150a and 150d respectively, if device 150a is closer to a more highly trafficked route than device 150d, device 150a may determine that consumer 128a is more likely to face or potentially interact with device 150a. In other words, if the method outlined by flowchart 680a in FIG. 6A were performed with respect to both devices 150a and 150d, software code 108 may adjust an algorithm utilized for action 684 with respect to device 150a, such that consumer 128a is more likely to be determined to be facing display 158a, based on the position/location of device 150a relative to the consumer traffic pattern.

In various implementations, audio data detected by audio I/O features 262 may be utilized to generate PI. For example, software code 108/208a or 208b executed by respective hardware processor 104/204 or 254 can apply vocal pattern recognition techniques using NNs to identify unique vocal patterns in the audio data, and store corresponding PII in memory 106/206 or 256. By comparing recognized vocal patterns from audio data of devices 150a-150e against PII stored in memory 106/206 or 256, system 100 can uniquely track consumers 128a-128c as they talk and moves through retail environment 120. In a similar manner, system 100 can analyze unique patterns present in touchless gestures as PII to discriminate one consumer from another and track that consumer through retail environment 120.

As described above with reference to FIGS. 4A-4B, device 450 can transition between various modes. In one implementation, device 450 can be configured to be in a mode based on the time of day. The time of day for each mode may be input by employee 122 using retailing device 124 in FIG. 1. For example, after sunset, device 450 may automatically transition to a dark mode that reduces brightness or inverts the color scheme of display 458. As another example, after retail environment 120 closes operations for the day, device 450 may automatically transition to a night mode that completely powers off device 450. Alternatively, in night mode, device 450 may remain on, and in response to determining that a person is present in retail environment 120, device 450 may utilize speakers of audio I/O features 262 as an alarm, or utilize transceiver(s) 260 to dial an emergency number.

Figure 6B:
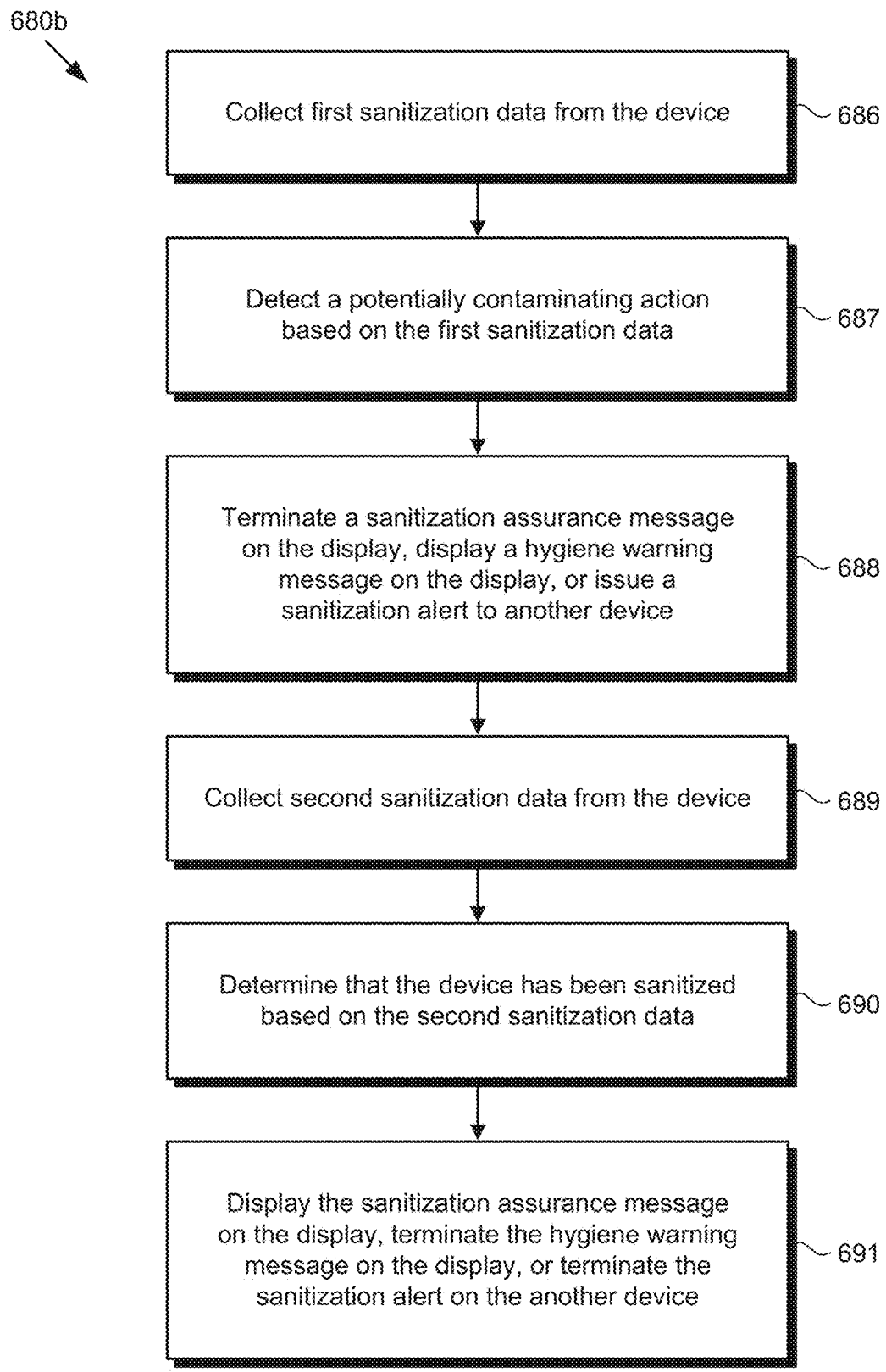
FIG. 6B shows a flowchart presenting an exemplary method of using the system of FIG. 1 for displaying or terminating a sanitization assurance message or a hygiene warning message, according to one implementation.

FIG. 6B shows flowchart 680b presenting an exemplary method of using system 100 of FIG. 1 for displaying or terminating a sanitization assurance message or a hygiene warning message, according to one implementation. With respect to the method outlined by FIG. 6B, it is noted that certain details and features have been left out of flowchart 680b in order not to obscure the discussion of the inventive aspects disclosed in the present application.

Referring to FIG. 6B in combination with FIGS. 1-4B, flowchart 680b begins with collecting first sanitization data 242 from device 250 (action 686). Sanitization data 242 can include a sanitization status of device 250 (e.g., sanitized or potentially contaminated) or other data stored in memory 256, messages received from computing platform 202 or retailing device 124, as well as inputs to audio I/O features 262, camera(s) 264, P/L sensor(s) 266, and a touchscreen of device 250.

Referring to FIG. 6B in combination with FIGS. 1-4B, flowchart 680b continues with detecting a potentially contaminating action based on first sanitization data 242 (action 687). As used herein, a "potentially contaminating action" refers to any interaction between a person and device 250 that may contaminate device 250, regardless of whether the interaction includes physical contact.

In one implementation, software code 208a/208b detects a potentially contaminating action based on physical contact between a person and device 250. For example, a touchscreen input may be detected as a potentially contaminating action. As another example, a heat sensor in device 250 may sense that a person has held device, which may be detected as a potentially contaminating action. As yet another example, position/location data distinguished as intentional physical movement of device 250 by a person, rather than an unintentional or insignificant interaction such as toppling from a display stand, may be detected as a potentially contaminating action. As a further example, image recognition techniques applied to camera data may indicate that a person likely touched device 250, which may be detected as a potentially contaminating action.

Software code 208a/208b can also detects a potentially contaminating action based on without requiring the person to touch device 250. For example, inputs to audio I/O features 262, camera(s) 264, P/L sensor(s) 266 may be utilized to determine if a person coughs, sneezes, or exhibits other respiratory symptoms near device 250, which may be detected as a potentially contaminating action. As another example, employee 122 may witness a contaminating interaction not automatically detected by devices 150a-150e. Employee 122 may input to retailing device 124 an indication regarding which of devices 150a-150e is/are potentially contaminated, retailing device 124 or computing platform 102/202 may generate a contamination message indicating which of devices 150a-150e is/are potentially contaminated, and may transmit the contamination message to the appropriate device 250, which may be detected as a potentially contaminating action. Alternatively, when employee 122 witnesses a contaminating interaction not automatically detected by devices 150a-150e, employee may make a touchless gesture, such as "two thumbs down," which may be detected by camera(s) 264 as a potentially contaminating action.

In one implementation, detecting a potentially contaminating action may be partially based on the locations of devices 150a-150e or the consumer traffic patterns. As described above, memory 106/206 or 256 may store a map of retail environment 120 including the traffic patterns as well as the locations of devices 150a-150e in retail environment 120 reported by P/L sensor(s) 266. Where detecting a potentially contaminating action includes a probabilistic likelihood calculation, devices closer to a more highly trafficked route may be calculated to have a higher likelihood of contamination.

In one implementation, software code 108/208a/208b avoids detecting a potentially contaminating action based on the sanitization status of device 250. For example, memory 106/206 or 256 may store and update a sanitization status (e.g., sanitized or potentially contaminated) for each of devices 150a-150e. When the sanitization status of a device is already registered as contaminated, software code 108/208a/208b may avoid detecting a potentially contaminating action for that device is already registered as contaminated. In particular, software code 108/208a/208b may avoid running subroutines for actions 686-688 in FIG. 6B.

Referring to FIG. 6B in combination with FIGS. 1-4B, flowchart 680b continues with terminating sanitization assurance message 348 on display 358, displaying hygiene warning message 349 on display 358, or issuing a sanitization alert to another device (action 688). Referring to FIG. 3, terminating sanitization assurance message 348 on display 358 or displaying hygiene warning message 349 on display 358 may aid a consumer or employee in readily recognizing the sanitization status of device 350. In one implementation, hygiene warning message 349 is only displayed in the second mode when a person is facing display 358 or is otherwise deemed potentially interactive. In order to more discretely inform a consumer or employee of the sanitization status of device 350, a sanitization alert may be issued to retailing device 124 in response to detecting the potentially contaminating action, or may be issued a personal device of the consumer in response to the consumer scanning QR code 577 or an NFC or RFID tag of device 350/550.

Referring to FIG. 6B in combination with FIGS. 1-4B, flowchart 680b continues with collecting second sanitization data 242 from device 250 (action 689). Collecting second sanitization data in action 689 may be performed in the same manner as collecting first sanitization data in action 686. Action 689 merely represent that software code 108/208a/208b continues to collect sanitization data.

Referring to FIG. 6B in combination with FIGS. 1-4B, flowchart 680b continues with determining that device 250 has been sanitized based on second sanitization data 242 (action 690). As described above, determining that device 250 has been sanitized can be specified by dedicated sanitization inputs from employee 122 in several ways. Employee 122 would be to indicate this on retailing device 124 by specifying the device position in retail environment 120 or by using proximity sensors of retailing device 124 to devices 150a-150e/250. Also, a custom gesture could be used as an input to devices 150a-150e/250 that a particular device has been sanitized. Options include a quadruple tap, or a combination of long and short taps, on the touchscreen, or a unique hand gesture in front of camera(s) 264, such as "two thumbs up" or a circular wiping motion.

Determining that device 250 has been sanitized can also be performed automatically in response to device 250 having been sanitized, without requiring an additional sanitization input or an additional sanitization gesture. As used herein, "an additional sanitization input or an additional sanitization gesture" refers to actions primarily performed to input sanitization data, rather than actions performed to actually sanitize the device itself. Thus, automatically determining that device 250 has been sanitized, without requiring additional sanitization inputs or additional sanitization gestures, can reduce time spent by employee 122 when updating the sanitization status of device 250.

In one implementation, software code 208a/208b may distinguish that position/location data sensed by P/L sensor(s) 266 is consistent with movement of device 250 during sanitization. For example, motion consistent with circular cloth wiping or back-and-forth cloth wiping wipe-down may be utilized to determine that device 250 has been sanitized In another implementation, software code 208a/208b may distinguish that temperature data sensed by a temperature sensor is consistent with a change in temperature of device 250 during sanitization due to evaporation of a cleaning solution. This temperature data may include timestamps, such that the rate of change in temperature can be determined. Software code 208a/208b may utilize such time-stamped temperature data to automatically detect that device 250 has been sanitized, while also accounting for temperature increases attributable to consumer interactions with device 250. For example, when device 250 is idle or at room temperature, evaporation of a cleaning solution may occur more slowly. In contrast, when device 250 is in a second mode and has experienced several consumer interactions, device 250 may be at a temperature significantly higher than room temperature, for example, due to increased use of hardware processor 254 or display 258. As a result, evaporation of a cleaning solution may occur more quickly.

Referring to FIG. 6B in combination with FIGS. 1-4B, flowchart 680b concludes with displaying sanitization assurance message 348 on display 358, terminating hygiene warning message 349 on display 358, or terminating a sanitization alert on another device (action 691). Action 691 may be performed in substantially the opposite manner as action 688. In one implementation, sanitization assurance message 348 is only displayed in the second mode when a person is facing display 358 or is otherwise deemed potentially interactive. Terminating sanitization alert on another device may include no longer displaying the sanitization alert on retailing device 124 or on a personal device of a consumer who previously scanned QR code 577 or an NFC or RFID tag of device 350/550.

Thus, as described above, the present application discloses systems, software, and methods for ensuring hygienic interactions with consumer devices being promoted for sale or lease. By configuring such consumer devices to detect the presence of a potentially interactive consumer through facial recognition, even when the consumer is wearing a mask, the present solution advantageously encourages hygienic best practices on the part of the consumer, while imposing no additional inconvenience for that socially responsible conduct. Furthermore, by initiating the display of promotional content automatically in response to detecting the presence of the consumer, the present solution advantageously enables the consumer to interact extensively with the consumer device to obtain pricing information, device specifications, and instructions for utilizing voice commands or touchless gestures to access additional content, without making physical contact with the device. Moreover, according to the present solution, a sanitized device that has not been touched, or used by an unmasked consumer, displays a sanitization assurance message until a potentially contaminating action occurs, at which time the sanitization assurance message disappears until the device is re-sanitized by a retail employee.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A device comprising:
a display;
a camera;
a hardware processor;
a memory storing a software code;
the hardware processor configured to execute the software code to:
configure the device to be in a first mode, wherein the display displays a first content when the device is in the first mode;
receive, from the camera, camera data of an environment surrounding the device;
determine that a person is present in the environment based on the camera data;
determine that the person is facing the display based on the camera data; and
transition the device from the first mode to a second mode, in response to determining that the person is facing the display, wherein the display displays a second content different than the first content when the device is in the second mode, wherein the second content is configured to provide information about the device to the person without requiring the person to touch the device.

2. The device of claim 1, wherein the information about the device provided to the person in the second content includes a sanitization status of the device.

3. The device of claim 1, wherein the information about the device provided to the person in the second content includes at least one of operating specifications of the device, a list of features of the device, pricing information for the device, a promotional video of the device, or services available for the device.

4. The device of claim 1, wherein the second content comprises at least one of a quick response (QR) code, instructions for utilizing voice commands, instructions for utilizing touchless gestures, or instructions for utilizing near-field communication (NFC).

5. The device of claim 1, wherein the hardware processor is further configured to execute the software code to:
increase a frame rate of the camera when the device transitions from the first mode to the second mode.

6. The device of claim 1, wherein determining that the person is facing the display comprises at least one of:
   determining, based on the camera data, that a face of the person is within a threshold distance of the device;
   determining, based on the camera data, that the face occupies a threshold pixel area; or
   determining, based on the camera data, that the face remains recognizable for a threshold time period.

7. The device of claim 1, wherein the hardware processor is further configured to execute the software code to:
   detect a potentially contaminating action; and
   perform at least one of terminate a sanitization assurance message on the display, display a hygiene warning message on the display, or issue a sanitization alert to another device.

8. The device of claim 7, wherein detecting the potentially contaminating action is performed without requiring the person to touch the device.

9. The device of claim 1, wherein the hardware processor is further configured to execute the software code to:
   determine that the device has been sanitized; and
   perform at least one of display a sanitization assurance message on the display, terminate a hygiene warning message on the display, or terminate a sanitization alert on another device.

10. The device of claim 9, wherein determining that the device has been sanitized is performed automatically in response to the device having been sanitized, without requiring an additional sanitization input or an additional sanitization gesture.

11. A method for use by a device including a display, a camera, a hardware processor, and a memory storing a software code, the method comprising:
   configuring, by the software code executed by the hardware processor, the device to be in a first mode, wherein the display displays a first content when the device is in the first mode;
   receiving, by the software code executed by the hardware processor, from the camera, camera data of an environment surrounding the device;
   determining, by the software code executed by the hardware processor, that a person is present in the environment based on the camera data;
   determining, by the software code executed by the hardware processor, that the person is facing the display based on the camera data; and
   transitioning, by the software code executed by the hardware processor, the device from the first mode to a second mode, in response to determining that the person is facing the display, wherein the display displays a second content different than the first content when the device is in the second mode, wherein the second content is configured to provide information about the device to the person without requiring the person to touch the device.

12. The method of claim 11, wherein the information about the device provided to the person in the second content includes a sanitization status of the device.

13. The method of claim 11, wherein the information about the device provided to the person in the second content includes at least one of operating specifications of the device, a list of features of the device, pricing information for the device, a promotional video of the device, or services available for the device.

14. The method of claim 11, wherein the second content comprises at least one of a quick response (QR) code, instructions for utilizing voice commands, instructions for utilizing touchless gestures, or instructions for utilizing near-field communication (NFC).

15. The method of claim 11, further comprising:
   increasing, by the software code executed by the hardware processor, a frame rate of the camera when the device transitions from the first mode to the second mode.

16. The method of claim 11, wherein determining that the person is facing the display comprises at least one of:
   determining, based on the camera data, that a face of the person is within a threshold distance of the device;
   determining, based on the camera data, that the face occupies a threshold pixel area; or
   determining, based on the camera data, that the face remains recognizable for a threshold time period.

17. The method of claim 11, further comprising:
   detecting, by the software code executed by the hardware processor, a potentially contaminating action; and
   performing, by the software code executed by the hardware processor, at least one of terminating a sanitization assurance message on the display, displaying a hygiene warning message on the display, or issuing a sanitization alert to another device.

18. The method of claim 17, wherein detecting the potentially contaminating action is performed without requiring the person to touch the device.

19. The method of claim 11, further comprising:
   determining, by the software code executed by the hardware processor, that the device has been sanitized; and
   performing, by the software code executed by the hardware processor, at least one of displaying a sanitization assurance message on the display, terminating a hygiene warning message on the display, or terminating a sanitization alert on another device.

20. The method of claim 19, wherein determining that the device has been sanitized is performed automatically in response to the device having been sanitized, without requiring an additional sanitization input or an additional sanitization gesture.

* * * * *